United States Patent

Wu et al.

[11] Patent Number: 6,157,663
[45] Date of Patent: Dec. 5, 2000

[54] LASER WITH OPTIMIZED COUPLING OF PUMP LIGHT TO A GAIN MEDIUM IN A SIDE-PUMPED GEOMETRY

[75] Inventors: Xingkun Wu, Valencia; Jouni P. Partanen, Los Angeles; William F. Hug, Pasadena; Hamid Hemmati, Encino, all of Calif.

[73] Assignee: 3D Systems, Inc., Valencia, Calif.

[21] Appl. No.: 09/061,796

[22] Filed: Apr. 16, 1998

[51] Int. Cl.$^7$ ..................................................... H01S 3/091
[52] U.S. Cl. ................................. 372/75; 372/75; 372/34; 372/78; 372/10; 372/70; 372/72; 372/69; 372/92; 372/101; 372/71; 372/79
[58] Field of Search ................................. 372/75, 34, 78, 372/10, 70, 72, 69, 92, 101, 71, 19, 73

[56] References Cited

U.S. PATENT DOCUMENTS

| | | |
|---|---|---|
| 4,346,314 | 8/1982 | Craxton . |
| 4,510,402 | 4/1985 | Summers et al. . |
| 4,575,330 | 3/1986 | Hull . |
| 4,710,940 | 12/1987 | Sipes, Jr. . |
| 4,794,615 | 12/1988 | Berger et al. ............................. 372/69 |
| 4,826,283 | 5/1989 | Chuangtian . |
| 4,942,582 | 7/1990 | Kintz et al. . |
| 5,103,457 | 4/1992 | Wallace et al. ............................. 372/92 |
| 5,130,995 | 7/1992 | Grossman et al. ......................... 372/13 |
| 5,170,406 | 12/1992 | Tidwell ..................................... 372/71 |
| 5,182,715 | 1/1993 | Vorgitch . |
| 5,184,307 | 2/1993 | Hull . |
| 5,315,612 | 5/1994 | Alcock et al. . |
| 5,412,683 | 5/1995 | Nighan, Jr. et al. . |
| 5,455,838 | 10/1995 | Heritier et al. . |
| 5,485,482 | 1/1996 | Selker et al. . |
| 5,511,085 | 4/1996 | Marshall ................................... 372/22 |
| 5,577,060 | 11/1996 | Nighan, Jr. et al. . |
| 5,590,147 | 12/1996 | Hobbs et al. . |
| 5,627,849 | 5/1997 | Baer ......................................... 372/31 |
| 5,638,397 | 6/1997 | Nighan, Jr. et al. . |
| 5,651,020 | 7/1997 | Nighan, Jr. et al. . |
| 5,663,979 | 9/1997 | Marshall ................................. 372/103 |
| 5,774,489 | 6/1998 | Moulton et al. .......................... 372/70 |
| 5,835,513 | 11/1998 | Pieterse et al. ........................... 372/22 |
| 5,840,239 | 11/1998 | Partanen et al. ......................... 264/401 |
| 5,912,912 | 6/1999 | Caprara et al. ............................ 372/25 |
| 6,002,697 | 12/1999 | Govorkov et al. ........................ 372/34 |
| 6,013,336 | 1/2000 | Baumgart et al. ....................... 427/555 |

FOREIGN PATENT DOCUMENTS

| | | |
|---|---|---|
| 9619855 | 6/1996 | WIPO . |
| 97/45902 | 12/1997 | WIPO . |

OTHER PUBLICATIONS

"High–Efficiency Diode–Pumped Nd:YVO$_4$ Slab Laser," J. E. Bernard and A. J. Alcock, Optics Letters, vol. 18, No. 12, Jun. 16, 1993, pp. 968–970.

"Recent Developments in the Growth, Processing and Testing of Rare Earth Doped YVO$_4$ Single Crystals," Greg Mizel et al., SPIE, vol. 2115, Visible and UV Lasers, 1994, pp. 53–59.

"Intracavity Tripling of Diode–Pumped Nd:YVO$_4$ at High Q–Switch Repetition Rates," Anthony J. Alfred, CPD19–1 to CPD19–5, undated.

U.S. Pat. application Ser. No. 08/792,374, filed Jan. 1997.
U.S. Pat. application Ser. No. 08/847,855, filed Apr. 1997.

*Primary Examiner*—Frank G. Font
*Assistant Examiner*—Delma R. Flores Ruiz
*Attorney, Agent, or Firm*—William Wright; Ralph D'Alessandro

[57] ABSTRACT

A solid-state laser includes a high-absorption coefficient solid-state gain medium such as Nd:YVO$_4$ that is side pumped with a semiconductor laser diode array. The resonant cavity of the solid-state laser is positioned so that the TEM$_{00}$ mode is spaced from the face of the laser through which the laser is pumped by a distance sufficient to reduce diffraction losses but sufficiently near to allow coupling of pump light into the gain mode. The gain medium, the doping level of the gain medium, and the operating temperature of the pump laser are selected to efficiently couple pump light into the gain mode. The pump laser is positioned to side pump the gain medium without collimating or focusing optics between the pump laser and the face of the gain medium. A gap between the pump laser and the gain medium is empirically selected to match the angular extent of the pump laser output light to the height of the gain mode at the position of the gain mode fixed to optimize coupling and diffraction losses.

100 Claims, 9 Drawing Sheets

LASER WITH OPTIMIZED COUPLING OF PUMP LIGHT TO A GAIN MEDIUM IN A SIDE-PUMPED GEOMETRY

BACKGROUND OF THE INVENTION

1. Field of the Invention

The present invention relates to the optimized coupling of pump radiation into the gain medium of a laser and to systems including such lasers. Particular aspects of the present invention relate to the use of one or more arrays of semiconductor diodes to side pump a high-absorption, high-gain solid-state gain medium such as neodymium yttrium vanadate.

2. Description of the Related Art

Solid-state lasers are a class of lasers that use as a gain medium a crystalline, glass or other solid material as a host for an optically excitable material, such as an ion of a rare earth element like neodymium. The crystalline, glass or other solid host material acts as a matrix fixing the optically excitable material in place. For illustrative purposes, it is convenient to consider a common solid-state laser system that uses yttrium aluminum garnet (YAG) doped with neodymium ions as a gain medium. This system is usually identified as Nd:YAG. Application of pump radiation to the Nd:YAG solid-state gain medium excites $Nd^{3+}$ dopant ions within the YAG host material to metastable states that have lifetimes which allow the population of the states to become inverted in such a manner that optical transitions of the dopant ions from the excited metastable states can be used to establish laser action. Some solid-state laser systems use a broad-band optical radiation source such as a xenon flash-lamp or other type of flash-lamp to provide pump radiation to the gain medium to excite the dopant ions to their desired metastable states. Flash-lamps have the advantages of high available power levels and comparatively low cost. Nevertheless, the use of broad-band, poorly-focused pump radiation is undesirable because pump radiation is absorbed in portions of the gain medium other than within the resonant modes of the laser. Pumping portions of the gain medium that are not within the resonant modes does not result in laser action and generates heat that must be dissipated, and so can limit the range of usable pump intensities.

A second undesirable aspect of the inefficiency of flash-lamp excitation is that the broadband radiation of flash-lamps is not well matched to the task of pumping the dopant ions within the resonant modes to the desired excitation levels. That is, within flash-lamp pump radiation there are many photons with more energy than is necessary to excite the neodymium ions of the solid-state gain medium to their desired metastable states. When these too energetic photons are absorbed by the dopant ions, the excess optical energy absorbed by the neodymium ions beyond what is necessary to place the neodymium ions in their desired metastable state is dissipated at least partially through thermal excitation of the solid-state gain medium. In other words, the excess energy within the radiation absorbed into the resonant modes heats the gain medium. To a lesser extent, a similar phenomenon occurs for photons within the radiation that are insufficiently energetic to excite the neodymium ions to their desired states. Materials suitable as solid-state gain media tend to have imperfect crystal structures with comparatively broad absorption bands and with significant levels of defect-mediated absorption for comparatively low-energy photons. The fraction of the flash-lamp radiation absorbed that is insufficiently energetic to excite the dopants to their desired metastable states is also typically dissipated at least partially through heating of the gain medium.

For a variety of reasons, dissipating heat and avoiding unnecessary heat generation are important considerations for solid-state gain media. Solid-state lasers are generally used in high power applications, with corresponding high levels of input pumping power and high levels of heating of the gain medium. The cooling of solid-state gain media, whether using coolant based refrigerators or using solid-state refrigerators, is not wholly satisfactory because solid-state gain media are generally poor thermal conductors so that the interiors of solid-state gain media are in poor thermal communication with the surfaces through which cooling may occur. There is consequently a limit to the rate at which heat can be extracted from the pumped portion of the gain medium by cooling. Thus, the inherent properties of solid-state gain media and solid-state lasers are such that heat will build up in the gain media of these lasers. To make matters worse, solid-state gain media tend to be particularly ill suited to excessive heating conditions. Solid-state gain media are typically susceptible to mechanical failure under high thermal stress. Consequently, heating of the solid-state gain medium is frequently a limit on system performance.

The various problems associated with flash-lamp pumping of solid-state gain media have historically limited the applications for which solid-state lasers were considered appropriate. A major advance for the practical application of solid-state lasers proceeded from the maturation of semiconductor diode lasers as excitation sources for pumping the solid-state gain media. Through the use of sophisticated manufacturing techniques, semiconductor lasers are now available operating at wavelengths that are very close in energy to the excitation energies most suitable for many solid-state laser systems. These semiconductor lasers exhibit desirable mode quality and operate at sufficiently high energies to be useful for pumping solid-state gain media. Commercially available semiconductor lasers with output powers of twenty watts or greater generally consist of a linear array of discrete laser diode emitters formed on a single chip. These semiconductor laser bars can be made to have any of a variety of desirable output wavelengths and, for example, can have an output wavelength near 808 nanometers, which is convenient for pumping a solid-state laser system like Nd:YAG. Furthermore, these diode lasers are tunable during use over a sufficient range (±3 nanometers) to allow the diode laser bar to be matched to a particular solid-state gain medium. Tuning of semiconductor lasers is accomplished by adjusting the operating temperature of the semiconductor laser. The availability of semiconductor laser output wavelengths matched to the energy levels being pumped is important because it allows the efficient pumping of the solid-state gain medium with very little of the pump radiation directly generating heat within the gain medium. Energy level efficient pumping of the gain medium significantly reduces the amount of heat generated in the solid-state gain medium due to imprecise pumping.

Although semiconductor lasers can efficiently pump solid-state gain media, the maximum power output of semiconductor lasers is lower than is desirable for many solid-state laser applications. Consequently, it is important to collect as much of the semiconductor laser's pump light as is possible within the gain volume of the solid-state gain medium to take advantage of as much of the semiconductor laser's output intensity as is practical. The commonly used Nd:YAG gain medium is not a strong absorber of the wavelength of light most appropriate to pumping the neodymium ions within the YAG matrix. When a semiconductor laser is used to side pump a Nd:YAG gain medium, a substantial fraction of the pump light can pass entirely through the relatively small cross-sectional dimensions of the Nd:YAG gain medium without being absorbed. It is consequently very desirable that the pump light output by the semiconductor laser be directed along the longest axis of solid-state gain media like Nd:YAG and that the optical axis of the resonant cavity extend along a direction nearly parallel to that longest axis to increase the amount of semiconductor laser pump light that is absorbed within the resonant modes of the gain medium. Because of this, many solid-state lasers pumped by semiconductor lasers have used what is called an "end-pumped" configuration. Typical solid-state lasers include a resonant cavity defined by front and back mirrors with a generally cylindrical or rectangular-prism shaped gain medium placed within the resonant cavity so that the end faces of the gain medium are located along an optical axis that encounters or faces respective ones of the front and back mirrors. In some cases at least one of the mirrors is formed on one of the end faces of the gain medium. An end-pumped laser is one in which the pump radiation is provided to the gain medium through a back mirror specially designed to transmit high levels of the pump light to the gain medium and that still functions as a high reflectivity mirror at the lasing wavelength. For most such end-pumped solid-state lasers, there is a linear optical axis that passes from the pump source, through the front and back mirrors and through the resonant mode volume within the solid-state gain medium. Often, efforts are made to size and shape the beam of pump light produced by the semiconductor laser to closely approximate or match the mode volume in at least portions of the gain medium of the solid-state laser. Attempts to match the size and shape of the pump beam to the mode volume have the goal of maximizing coupling of the semiconductor laser's output to the resonant mode within the gain medium, which generally maximizes output from the solid-state laser while reducing heat generation.

While an end-pumped configuration is very useful for efficiently coupling pump radiation from a semiconductor laser into the gain medium of a solid-state laser, there are practical difficulties in accomplishing the beam shaping and end coupling of the semiconductor laser to the gain medium. A typical crystal of Nd:YAG might measure one to two millimeters along its smaller axes and about one centimeter along its longest axis. The diameter of the gain mode defined within that gain medium is generally much smaller, on the order of two hundred to five hundred microns. High output semiconductor lasers generally have spatially distributed outputs derived from an array of emitters spaced over a distance of one-half centimeter to over one centimeter. Consequently, the optical output of a high output semiconductor laser will be an elongated beam having a major axis width on the order of one centimeter. Implementation of end pumping of a solid-state laser with a semiconductor laser therefore often requires that the laterally elongated output of the semiconductor laser be reshaped and focused to a small spot size to efficiently couple the semiconductor laser pump light through the small (~1 mm×~1 mm) end faces of the gain medium and into the gain volume. A sophisticated lens assembly might for example, accomplish this reshaping and focusing.

Economically providing the appropriate sophisticated lens assembly to function as the beam shaping optics that efficiently couple the elongated output from a semiconductor diode array into the end of a solid-state gain medium is difficult. Consequently, end-pumped lasers often use plural optical fibers to independently direct the output from the individual emitters of the semiconductor laser array into the end face of the gain medium. The use of plural independent fibers allows for the easy reshaping of the elongated output of the semiconductor laser array to a generally circular shape that is useful for end pumping a laser mode. Efficient coupling of the individual emitters to the pump face of the gain medium requires precise alignment of the optical fibers to the individual emitters. The alignment of the individual fibers to the individual emitters of the semiconductor laser bar is a difficult and expensive task. Regardless of whether a sophisticated lens assembly or fiber bundle coupling is used to couple the output of the semiconductor laser into the solid-state gain medium, the use of an end pumping configuration requires the use of optics that either are difficult to align and consequently expensive or are readily useable but expensive. End-pumped laser configurations also require at least one special cavity mirror adapted for transmitting pump radiation to the gain medium while still functioning acceptably as a cavity mirror.

End-pumped lasers are also constrained as to the extent by which they can be scaled. Such scaling would be desirable, for example, in obtaining higher levels of power output from the solid-state laser by coupling additional pump sources or greater pump intensity to the gain medium. End-pumped lasers couple all pump radiation into the solid-state gain medium through a portion of one of the small end faces of the gain medium. This presents two distinct sets of problems. First, there are problems to be overcome in coupling multiple semiconductor pump lasers to a solid-state laser in an end-pumped configuration. As discussed above, the mismatch in sizes between the spatially extended emitter region of the semiconductor laser and the gain volume requires special optics. Such optics might accommodate only a single semiconductor laser array and are not readily modified to accommodate multiple semiconductor laser arrays. Consequently, there may be physical space limitation problems that make it impractical to use pump sources to create higher pumping intensities in end-pumped lasers. A second problem is that the scalability of end-pumped solid-state lasers is fundamentally limited because all of the pump power passes through a single, confined portion of an end face of the solid-state gain medium. The total incident power that may be applied to the gain medium is limited by the fracture energy density of the gain medium. Application of greater pump intensities to the end face of the gain medium can cause the gain medium to fracture. In addition, much of the thermal stress on the solid-state gain medium occurs within a limited volume at the face of the gain medium. Even when the gain medium is not a strong absorber of the pump light, as is the case with Nd:YAG, the highest level of thermal buildup will be adjacent the entrance face of the gain medium. For gain media that exhibit significant thermal lensing effects, such a localization of heat input is particularly undesirable and detrimental to beam quality. The localized thermal loading associated with end pumping means that end-pumped lasers will generally be more limited as to the levels of optical pumping power that can be coupled into the solid-state gain medium in a reliable manner.

There has accordingly been a need to provide a solid-state laser system that is more readily scalable and which is optically less complex. Side pumped lasers offer some promise but, as is discussed briefly above, side pumped solid-state lasers tend to not effectively utilize input pump radiation. One alternative to this problem has been presented in the work of A. J. Alcock and J. E. Bernard as described in U.S. Pat. No. 5,315,612, entitled "High Efficiency Transversely Pumped Solid-State Slab Laser," and in Bernard, et al., High-Efficiency Diode Pumped Nd:YVO$_4$ Slab Laser, 18 *Optics Letters* 968–970 (June 1993) (together hereinafter referenced as the Alcock patent). The Alcock patent describes a side pumped solid-state laser that uses a very high-absorption coefficient gain medium, neodymium yttrium vanadate or Nd:YVO$_4$, so that substantially all of the input pump radiation is absorbed within 250 microns of the surface of the gain medium. Because the absorption of the Nd:YVO$_4$ gain medium is so high, the Alcock patent teaches that it is necessary to use a grazing angle geometry for the optical path within the gain medium. The cavity mirrors for the Alcock patent's laser are positioned so that the resonant laser modes are internally reflected off one of the side faces of the gain medium at a grazing angle of incidence. Pumping is accomplished using a semiconductor laser having an extended output that is directed through a portion of the side face of the gain medium from which the laser mode is internally reflected. High levels of pump radiation couple into the resonant laser modes because the low angle between the gain mode volume and the side of the gain medium means that the pump face intersects an enlarged mode cross-section through the gain volume.

The solid-state laser described in the Alcock patent utilizes side pumping in a manner that reduces the incident pump energy density and distributes the thermal load associated with pumping over a larger surface area of the gain medium than is typical of an end-pumped laser. In this manner the Alcock patent's laser overcomes some of the problems associated with the end-pumped solid-state laser described above. On the other hand, the geometry of the Alcock patent's laser introduces a number of different problems. A first problem with the geometry of the Alcock patent's laser is that the Alcock laser is not readily compatible with high repetition rate pulsed laser operation of the type typical of Q-switched solid-state lasers. The gain medium of the Alcock laser is heated by the pumping radiation from the semiconductor laser to produce strong thermal lensing effects at the surface of the gain medium through which pumping occurs. Variations in the thermal lens created at the pump surface of the Alcock laser's gain medium can introduce an unacceptable level of variations into the performance of the Alcock laser under pulsed operating conditions. For low pulse repetition rates of less than 1 kHz, variations in the thermal lensing associated with the heating of the Alcock laser's gain medium by the pump radiation do not produce unacceptable levels of variation. For repetition rates faster than 1 kHz, on the other hand, time variation in the thermal lens at the surface of the Alcock laser introduces variations in the output of the Alcock laser so that the output beam quality deteriorates to approximately one and one-half times the diffraction limited performance and significantly worse at higher repetition rates. The Alcock patent's laser is thus ill suited to high repetition rate pulsed operation.

A second problem with the laser geometry described in the Alcock patent is that the laser geometry of the Alcock patent necessarily introduces high levels of diffraction losses to the solid-state laser system. When the grazing angle geometry taught by the Alcock patent is applied to the available sizes of a solid-state gain medium, the path of the laser's gain mode within the medium enters and exits the gain medium very near the edges of the side face of the gain medium. As such, the gain mode of the laser suffers significant diffractive losses through the side face of the gain medium. The level of diffractive losses experienced for practical lasers attempting to adopt the Alcock patent's design are sufficiently high as to limit the optical output power from such lasers.

Related Applications

This application is related to U.S. patent application Ser. No. XX, filed concurrently herewith. This related application is incorporated by reference herein as if set forth in full.

Summary of the Preferred Embodiments

It is accordingly an object of some aspects of the present invention to provide a laser system incorporating a solid-state laser that is comparatively simple and which is capable of being pumped with increased levels of optical power.

It is an object of other aspects of the present invention to provide a side pumped solid-state laser having an efficient coupling of pump radiation into a gain volume spaced from a pump face of the gain medium.

These and other objects may be accomplished in a solid-state laser that includes a high-absorption coefficient solid-state gain medium such as Nd:YVO$_4$ side pumped with a semiconductor laser diode array. The resonant cavity of the solid-state laser is preferably positioned so that the gain mode is spaced from the face of the laser through which the laser is pumped by a distance sufficient to reduce diffraction losses but sufficiently near to allow coupling of pump light into the gain mode. In accordance with certain aspects of the invention, the pump laser is positioned to side pump the gain medium without collimating or focusing optics between the pump laser and the face of the gain medium. A gap between the pump laser and the gain medium might be empirically selected to match the angular extent of the pump laser output light to the height of the gain mode at the position of the gain mode fixed to optimize coupling and diffraction losses.

According to one aspect of the present invention, a laser system includes a laser cavity having an optical axis passing through the laser cavity. A solid-state gain medium having a transverse dimension and a vertical dimension is provided within the laser cavity with the optical axis passing through the solid-state gain medium. At least one semiconductor laser having an output wavelength is positioned to direct a beam of light through a pump surface of the gain medium to pump the gain medium, with the beam of light diverging in the vertical dimension within the gain medium. The beam of light from the at least one semiconductor laser pumps a laser mode within the gain medium to produce solid-state laser output. The laser cavity is defined so that the laser mode is positioned at a depth spaced from the pump surface of the gain medium. The at least one semiconductor laser is provided adjacent a face of the solid-state gain medium so that the beam of light output by the at least one semiconductor laser matches the laser mode.

A different aspect of the present invention provides a laser system with a laser cavity having an optical axis passing through the laser cavity. A solid-state gain medium is provided within the laser cavity and the optical axis passing through the solid-state gain medium. The laser system includes at least one semiconductor laser emitting a beam of light having a width greater than its height at an output of the at least one semiconductor laser. The semiconductor laser is positioned to direct the beam of light through a pump surface of the gain medium to pump the gain medium, with the beam of light diverging in a vertical dimension within the gain medium. The beam of light from the semiconductor laser pumps a laser mode within the gain medium to produce solid-state laser output. The laser cavity is defined so that the optical axis passes through the laser mode and through opposite ends of the gain medium and so that the laser cavity directs the laser mode only along the optical axis in a direction parallel to the pump surface of the gain medium. The at least one semiconductor laser is provided adjacent a face of the solid-state gain medium so that the beam of light output by the at least one semiconductor laser matches the laser mode.

Another aspect of the present invention provides a laser system with a lasing medium for producing a laser beam of a desired wavelength and at least one diode laser for directing a pumping beam along a pumping optical path for side pumping the lasing medium and producing a population inversion in the lasing medium. Optical elements are provided for forming a resonant cavity around the lasing medium defining a set of modes and producing the laser beam. The optical elements are disposed to position the optical set of modes within the lasing medium and the at least one diode laser provides a pump wavelength different from a peak of absorption of the lasing medium. The at least one semiconductor laser is provided adjacent a face of the lasing medium so that the pumping beam is matched to a lasing mode of the laser system.

Yet another aspect of the present invention provides a laser system with a lasing medium for producing a laser beam of a desired wavelength and at least one diode laser for directing a pumping beam along a pumping optical path for side pumping the lasing medium and producing a population inversion in the lasing medium. Optical elements form a resonant cavity around the lasing medium defining a set of modes and for producing the laser beam. The optical elements are disposed to position the optical set of modes within the lasing medium, so that the set of modes is spaced from all sides of the lasing medium. The pumping optical path contains no focusing optics between the at least one diode laser and the lasing medium.

BRIEF DESCRIPTION OF THE DRAWINGS

Aspects of the present invention are described with reference to the various views of the drawings, which are presented in schematic form.

DETAILED DESCRIPTION OF THE PREFERRED EMBODIMENTS

Figure 1:
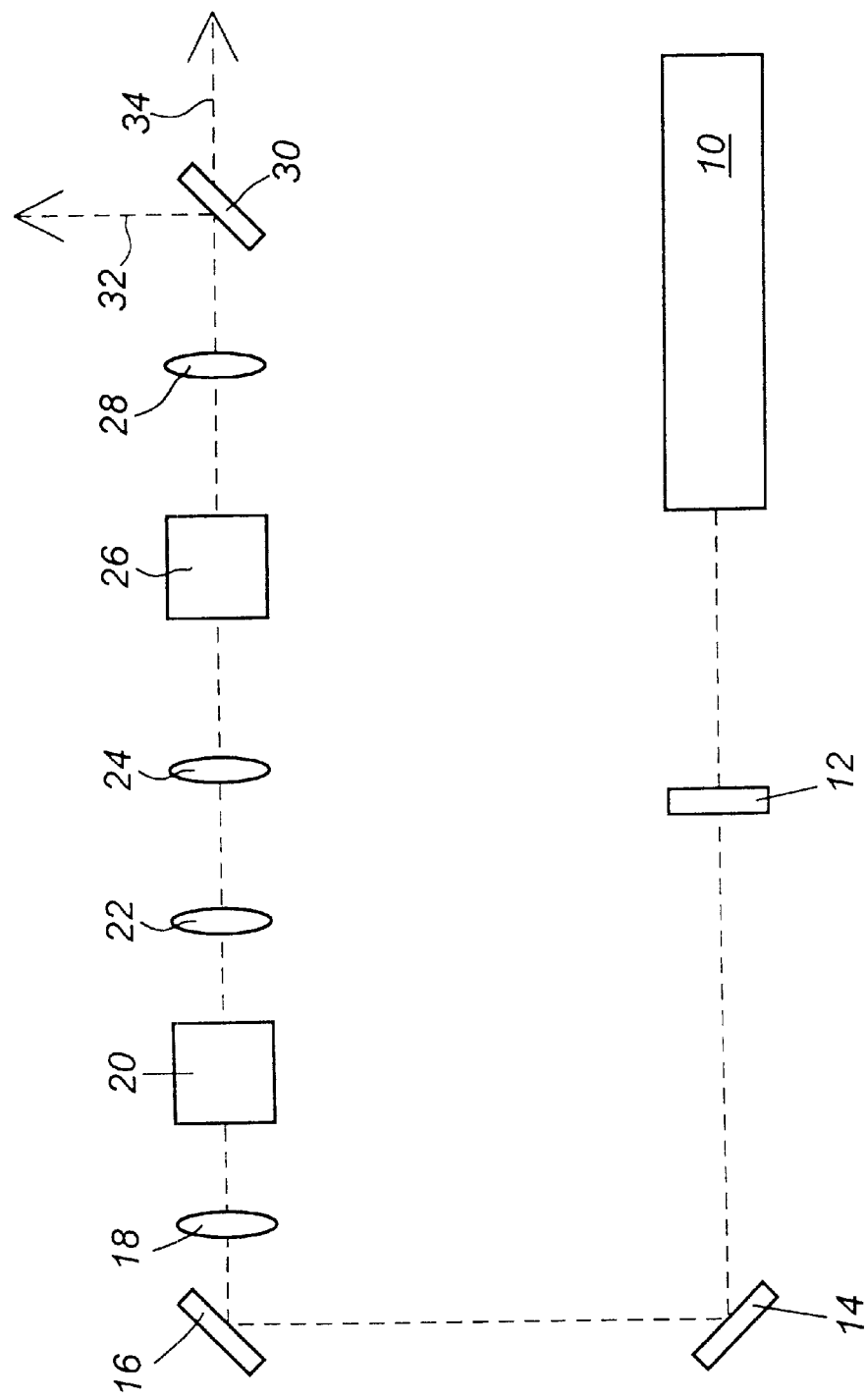
FIG. 1 shows an overall laser system in accordance with the present invention capable of producing frequency tripled output light from a solid-state laser emitting light at a fundamental frequency or wavelength.

Particularly preferred embodiments of the present invention provide a solid-state laser including a solid-state gain medium side pumped with a semiconductor laser diode array. The use of a side pumped configuration allows for the coupling of the extended output of the semiconductor laser into an extended gain volume within the solid-state gain medium so that the thermal loading on the solid-state gain medium is better distributed than in end-pumped configurations of solid-state lasers. To facilitate the coupling of high levels of pump light from the semiconductor laser into the gain medium, it is preferred that the solid-state gain medium have a relatively high level of absorption at the wavelength of the pump light. Selection of a high-absorption gain medium facilitates a more efficient coupling of pump radiation into the solid-state laser than is possible using a lower absorption coefficient gain medium such as Nd:YAG. Most preferably, a solid-state laser in accordance with the present invention provides a comparatively simple beam path through the gain medium which avoids the high diffraction losses associated with the grazing angle incidence geometry used in the Alcock patent and described above. For example, particularly preferred embodiments of the present invention provide a beam path that extends straight through the gain medium and is spaced from but near to the surface of the gain medium through which the pumping light is directed.

Preferred configurations of a solid-state laser provide elements such as mirrors and thermal lenses that define the volume of the resonant modes of the solid-state laser so that the lowest order and most spatially confined $TEM_{00}$ resonant mode is selected for the laser's operation. Furthermore, these preferred configurations of a solid-state laser position the $TEM_{00}$ mode of the laser cavity so that the edge of the $TEM_{00}$ mode, as defined by the $1/e^2$ intensity level for the mode, is spaced sufficiently far away from surfaces of the gain medium as to reduce diffraction losses from the $TEM_{00}$ mode to an acceptably low level. Selecting and positioning the $TEM_{00}$ mode in this manner within a high-absorption gain medium presents challenges for efficiently pumping the $TEM_{00}$ gain volume within the gain medium, since it is expected and conventionally taught that effective pumping of high-absorption gain media occurs only at the surface of such high-absorption coefficient gain media. In this regard, see U.S. Pat. No. 4,942,582 to Kintz, et al., entitled "Single Frequency Solid-state Laser," and U.S. Pat. No. 5,315,612 to Alcock, et al., entitled "High Efficiency Transversely Pumped Solid-State Slab Laser." The teachings of these patents with respect to the identity and properties of high-absorption coefficient solid-state laser gain media are hereby incorporated by reference.

Particularly preferred embodiments of the present invention accommodate the internal positioning of a laser gain mode with respect to a high-absorption coefficient gain medium by selecting the absorption properties of the gain medium. The absorption properties of the gain medium can be adjusted in part through the selection of the doping level of the gain medium. As a second adjustment on the absorption of the gain medium, it is also desirable to select the pump light so that the wavelength of the pump light is slightly removed or "detuned" from the peak of absorption of the gain medium. Selecting the wavelength of the pump light in this manner reduces the fraction of the pump light that is absorbed near the surface of the gain medium and increases the fraction of the pump wavelength absorbed within the laser gain mode. Selecting the wavelength of the pump light can be accomplished by design of the semiconductor laser diode or more practically through purchase of a commercially available semiconductor laser having an appropriate output wavelength. In addition, the wavelength of light output by commercially available semiconductor lasers can be tuned over a range of about six or more nanometers by adjusting the operating temperature of the semiconductor laser. By selecting the wavelength of the pump light in this manner, the depth at which light from the semiconductor laser is absorbed within the gain medium can be adjusted to couple a desired level of pump light into the gain volume within the gain medium. In this way, solid-state laser systems according to the present invention couple a high level of pump light from a semiconductor laser into a gain volume spaced from a surface of a high-absorption coefficient gain medium.

According to aspects of the present invention, a solid-state laser utilizes a high-absorption coefficient laser gain medium and side pumps the gain medium with a semiconductor diode laser array. In particularly preferred embodiments of the present invention, the laser gain volume within the high-absorption coefficient gain medium is spaced from an edge of the gain medium by a distance adequate to ensure low diffraction losses through the pump face of the gain medium. Most preferably, the pump laser is positioned adjacent to but spaced from the gain medium, with the spacing preferably chosen to optimize the $TEM_{00}$ output from the solid-state laser. Observations by the present inventors indicate that this optimum spacing between the pump laser and the gain medium does not correspond to the optimum spacing for maximizing the total multimode output power from the solid-state laser.

Particularly preferred embodiments of this aspect of the present invention side pump the gain medium in a modified butt coupling configuration. In other words, the output from the pump laser is directed to the gain medium without passing through a lens, but the spacing between the pump laser and the gain medium is not that of the typical butt coupling configuration. Rather, there is a greater separation between the pump laser and the gain medium than is conventional. The spacing most preferably is chosen to optimize coupling into a $TEM_{00}$ mode having a fixed position within the gain medium prior to and independent of the selection of the spacing. The position of the $TEM_{00}$ or other desired laser mode is defined within the gain medium by the configuration of and the relative positioning of the laser cavity with respect to the gain medium. With the laser gain mode held at a fixed position within the gain medium, the semiconductor laser is then positioned with respect to the gain medium primarily to optimize the coupling of pump radiation into the laser gain mode. As a further aspect of these embodiments, the separation between the pump laser and the gain medium is, as a matter of practicality, empirically optimized to obtain an optimum level of coupling. The coupling of the semiconductor laser pump radiation into the gain medium might alternately be achieved using a collimated beam matched in height to the empirically selected optimum gain volume by using appropriate optics in between the semiconductor pump laser and the gain medium. This alternate configuration might have some advantages for simplicity of manufacture, but would not be expected to be as highly optimized as the most preferred embodiments of the invention, which use a butt coupling configuration.

In particularly preferred embodiments of the present invention, the semiconductor pump laser is provided to the gain medium in a side pumped configuration where no optics are interposed between the side pumped gain medium and the side pumping semiconductor laser. In the absence of focusing or collimating optics, the semiconductor pump light diverges in a vertical direction. Increasing separation between the semiconductor pump light and the gain medium alters the height (vertical extent) of the pump light beam within the gain medium. Consequently, this simplified configuration readily facilitates adjustment of the height of the diverging output light from the semiconductor laser. In turn then, adjustment of the separation between the semiconductor laser and the gain medium adjusts the level of coupling of the pump radiation into the laser gain mode to allow selection of an optimal coupling of the pump radiation to the laser gain mode. Moreover, preferred configurations of the preferred solid-state laser system are both more efficient and more stable than conventional implementations of side pumped solid-state lasers.

In a still further aspect of the present invention, the invention provides a simplified optical system for an optical system using a high output power solid-state laser system. Preferably a laser system in accordance with the present invention operates in a pulsed operation mode with a pulse repetition frequency (PRF) of about 25 kHz or higher, which facilitates use of the laser in systems that are best implemented with pulsed laser output. The laser beam is produced with sufficiently good beam quality for efficient utilization of frequency harmonic generation (e.g., doubling or tripling) crystals. This facilitates the use of the solid-state laser system in the generation of frequency doubled, tripled or quadrupled light thereby producing optical output that is of particularly useable wavelengths including those within the ultraviolet region.

These and other aspects of the present invention will now be explained in greater detail with reference to the figures. The solid-state laser described below finds particular application in overall optical systems which produce a frequency doubled, tripled or quadrupled, reduced wavelength laser light as their optical output. Such optical systems are capable of outputting coherent laser radiation at wavelengths in the ultraviolet and may be useful for a range of important applications including within the field of Rapid Prototyping & Manufacturing (RP&M) and most particularly in the field of stereolithography. The present invention contemplates use of an optical system as described herein and incorporating a solid-state laser in accordance with aspects of the present invention within a stereolithographic apparatus in a manner like that described in pending U.S. patent application Ser. No. 08/792,374, filed Jan. 31, 1997 and entitled, "Apparatus and Method for Forming Three Dimensional Objects in Stereolithography Utilizing a Laser Exposure System Having a Diode Pumped Frequency Quadrupled Solid-state Laser," which is hereby incorporated by reference in its entirety. Of particular note in the referenced disclosure is the repetition frequency preferred to effectively use a pulsed solid-state laser in a stereolithographic apparatus as well as other design considerations for such an application. Another contemplated application of the present optical system is within the stereolithography apparatus described in U.S. patent application Ser. No. 08/847,855, filed Apr. 28, 1997 and entitled "Apparatus and Method for Controlling Exposure of a Solidifiable Medium Using a Pulsed Radiation Source in Building a Three-Dimensional Object Using Stereolithography," which is hereby incorporated by reference in its entirety. Stereolithographic methods and apparatus are also described in various other U.S. patents including: (1) U.S. Pat. No. 4,575,330 to Hull; (2) U.S. Pat. No. 5,182,715 to Vorgitch; and (3) U.S. Pat. No. 5,184,307 to Hull, each of which patents is hereby incorporated by reference in its entirety. For the embodiments described below that are particularly useful for use in stereolithographic systems such as those described in these applications and patents, it is particularly desirable that the laser beam input to the stereographic apparatus have a ellipticity that varies little from circular. For example, it is desirable that the input to the laser system has an ellipticity of less than 1.3 and preferred that the ellipticity be less than or equal to approximately 1.1. Most typically, the input to the stereographic apparatus will be a frequency tripled or quadrupled laser beam.

Because the design of the overall optical system according to embodiments of the present invention provides an important context for the discussion of preferred aspects and advantages of the solid-state laser, the more relevant and significant aspects of the overall optical system are first described. After this overview of the overall system, other more particular aspects of the solid-state laser design are discussed within the framework provided by the discussion of the overall laser system. FIG. 1 illustrates an overall optical system according to preferred embodiments of the present invention that includes a solid-state laser. It should initially be noted that the overall optical system illustrated in FIG. 1 produces three different wavelengths of light at different points along the optical path of the system, where the second and third wavelengths are harmonics of the first wavelength. Solid-state laser 10 outputs a fundamental wavelength of laser light, which determines the wavelengths of the second and third wavelengths (i.e., frequency doubled and tripled or quadrupled laser beams) within the optical system. Often, the solid-state laser 10 outputs a fundamental wavelength laser beam in the near infrared at a wavelength of about 1064 nanometers. The 1064 nanometer laser line is useful for a variety of reasons well known in the art, including the production of this line by exciting neodymium dopant ions within solid-state gain media and the compatibility of this laser line with pumping from semiconductor laser diodes. Operation of harmonic generation crystals within the optical system subsequently produces a frequency doubled 532 nanometer laser beam using a second harmonic generating crystal and then a frequency tripled 355 nanometer laser beam as the ultimate and desired output from the overall optical system. Because the 355 nanometer laser beam corresponds to a frequency tripling of the fundamental laser beam, the tripling crystal is referred to as a third harmonic generating crystal. Other embodiments of the invention might provide a second doubling crystal after the first doubling crystal to generate a frequency quadrupled laser beam as the output of the laser system.

The fundamental wavelength laser beam is output by the solid-state laser 10 and is first directed through a half wave plate 12, which rotates the polarization of the fundamental output beam by 90°. Inclusion of half wave plate 12 at this point along the optical path is primarily a matter of convenience in arranging the frequency conversion components within the overall optical system, particularly in obtaining an appropriate polarization of light to direct into the second harmonic generating crystal other polarizations may be with other harmonic crystals. In particularly preferred embodiments of the present invention, the fundamental wavelength laser beam will be linearly polarized in the horizontal direction (assuming the components in FIG. 1 are within a horizontal plane and a vertical direction is perpendicular to the plane of the drawings). Half wave plate 12 rotates the polarization to the vertical direction. The polarization-rotated beam is then reflected from a series of steering mirrors 14, 16, which redirect (i.e., fold) the optical path to provide a more compact footprint for the overall optical system and to allow the fundamental laser beam position and direction to be adjusted. The laser beam reflected from the second steering mirror 16 is then provided to a series of optical elements that effect the frequency doubling operation including a first lens 18, a second harmonic generating crystal 20, and a second lens 22. A distance of about 25 centimeters separates the first lens 18 from the output coupler of the solid-state laser 10 and the diameter (two times the beam waist radius or $2w_0$) of the fundamental laser beam at the first lens is approximately 2.5 millimeters.

The first lens 18 focuses the fundamental wavelength laser beam onto the second harmonic generating crystal 20 which, in a simple view, adds the energies of two photons of the fundamental wavelength light to produce a single photon twice as energetic as the photons which make up the fundamental wavelength laser beam. The single photon generated by combining two photons from the fundamental laser beam has two times the energy of the fundamental photon, has a frequency doubled from that of the fundamental photon, and has a wavelength of one-half of the fundamental laser beam's photons. This frequency doubling process is effected on a large scale within the second harmonic generating crystal 20 to produce a second beam of laser light with a doubled frequency (i.e., a "second harmonic") or a wavelength of about 532 nanometers. Such harmonic generating processes are known and possible using a number of different non-linear crystals, so long as the incident laser beam has an appropriately large amount of instantaneous power.

Particularly preferred embodiments of the present invention use lithium triborate ($LiB_3O_5$, "LBO") as the harmonic generation crystal both for the initial frequency doubling and the later frequency tripling (or quadrupling) operation within the FIG. 1 optical system. Production and aspects of the use of LBO as a frequency doubling crystal are described in U.S. Pat. No. 4,826,283, entitled "$LiB_3O_5$ Crystal and its Non-linear Optical Devices," which patent is hereby incorporated by reference in its entirety. At this time, LBO harmonic generation crystals are commercially available and their use for doubling, tripling and quadrupling applications is well understood by those of ordinary skill in this art. Discussions of the use of sequential identical crystals for second and then third harmonic generation can be found in U.S. Pat. No. 4,346,314, entitled "High Power Efficient Frequency Conversion of Coherent Radiation with Nonlinear Optical Elements," and in U.S. Pat. No. 4,510,402, entitled "Optical Harmonic Generator." The teachings of each of these patents with respect to the geometries and phase matching conditions for the two crystal third harmonic generation are hereby incorporated by reference. The primary difference between the frequency tripling applications described in the two referenced patents and the system illustrated in FIG. 1 is the use of non-critical phase matching for the second harmonic generating crystal in the particularly preferred embodiments of the present invention illustrated by FIG. 1. Non-critical phase matching refers to the primary use of temperature to meet the phase matching conditions for second harmonic generation within the first LBO crystal. This aspect of the FIG. 1 embodiment stands in contrast to the more conventional process of obtaining careful angular alignment between the crystalline axes of the doubling crystal and the propagation direction of the input fundamental wavelength laser beam.

Non-critical phase matching conditions are preferably adopted for the input of the fundamental wavelength laser beam into the first LBO crystal to facilitate a high level of overlap between the fundamental and doubled wavelengths within the second LBO crystal. Use of non-critical phase matching conditions also minimizes the extent of walk-off between the fundamental and doubled frequency beams within the second LBO crystal in practical implementations of the optical system. In the illustrated embodiment, the non-critical phase matching condition is met by holding the second harmonic generating crystal 20 at a temperature of about 148° C. For the preferred embodiments in which a vertically polarized fundamental laser beam is provided to the second harmonic generation crystal, the frequency doubled light output by the second harmonic generation crystal 20 is horizontally polarized. The portion of the fundamental wavelength laser beam transmitted through the second harmonic generation crystal remains vertically polarized.

Only a portion of the fundamental wavelength laser beam is converted into a frequency doubled laser beam in preferred implementations of the present invention. This is because the frequency summing operation accomplished by the third-harmonic generation crystal requires both photons of the fundamental wavelength laser beam and of the frequency doubled laser beam to produce frequency tripled photons. For example, it may be desirable to obtain approximately equal proportions of the fundamental wavelength photons and of the doubled frequency photons to input into the mixing operation performed by the third harmonic generating crystal. From a simple accounting perspective, that proportion would require that approximately two thirds of the energy in the fundamental wavelength laser beam input to the second harmonic generation crystal 20 be converted into frequency doubled light. Accordingly, the fundamental wavelength laser beam is focused into the second harmonic generation crystal 20 by the first lens 18. A portion of the fundamental (1064 nm) wavelength laser beam is converted to a frequency doubled (532 nm) laser beam and then both the fundamental and the doubled laser beams are output from the second harmonic generation crystal. The two output beams are then collimated by the second lens 22 and directed together toward the third harmonic generating crystal. To conveniently effect the collimation of the laser beam, it is desirable to select both the first and second lenses 18, 22 to have the same focal length, for example f=25 mm. Each of the lenses is then spaced from the center of the second harmonic generating crystal by a distance equal to the respective focal lengths of the first and second lenses. In the illustrated system, this lens assembly actually reproduces the slight divergence of the laser beam that was input to the first lens, although collimation is possible and may be desired under certain circumstances.

Next, the remaining portion of the fundamental wavelength laser beam and the frequency doubled laser beam are provided to a system of a third lens 24, a second LBO crystal that will function as a third harmonic generating crystal 26, and a fourth lens 28. The third harmonic generating crystal 26 combines the fundamental wavelength light and the previously frequency doubled light in a frequency summation operation. Frequency summation of the fundamental wavelength and second harmonic wavelength produces frequency tripled light having a wavelength that is a third harmonic of the fundamental wavelength of the light output by the solid-state laser 10. The ultraviolet 355 nanometer light output by the third harmonic generating crystal 26 is linearly polarized in the vertical direction in particularly preferred embodiments of the present invention. In some preferred embodiments the second LBO crystal may be designed for being held at a temperature above ambient such as, for example, 50° C.

The light output from the third-harmonic generating crystal generally includes all three wavelengths of light: fundamental light with a wavelength of about 1064 nanometers; frequency doubled light with a wavelength of about 532 nanometers; and frequency tripled light with a wavelength of about 355 nanometers. All three output beams are collimated by the fourth lens 28 and directed to an output beam splitter or harmonic separator 30. To conveniently effect the collimation of the laser beams, it is desirable to select both the third and fourth lenses 24, 28 to have the same focal length, for example f=50 mm. Each of the lenses is then spaced from the center of the second harmonic generating crystal by a distance equal to the respective focal lengths of the third and fourth lenses. Here again, in the illustrated embodiment, the output from the fourth lens will be slightly diverging laser beams rather than a fully collimated set of beams. The output beam splitter 30 selects and redirects frequency tripled, 355 nanometer light 32 as the most desired output of the optical system and allows the fundamental and frequency doubled beams to pass out of the system. Appropriate harmonic separators or beam splitters are commercially available.

In other embodiments, the second LBO crystal of the FIG. 1 embodiment might be used to generate a frequency quadrupled, fourth harmonic laser beam. Generally such a system would be useful to produce even shorter wavelengths of light, depending on the fundamental wavelength of light provided to the FIG. 1 system. Regardless of the desired tripled or quadrupled output, the optical system illustrated in FIG. 1 is advantageously implemented with a solid-state laser in accordance with particularly preferred aspects of the present invention. The following discussion particularly emphasizes these aspects of the present invention and describes in greater detail aspects of the solid-state laser in accordance with the present invention.

Aspects of the performance of the preferred laser system are closely related to the choice of Nd:YVO$_4$ (neodymium yttrium vanadate) as the preferred solid-state gain medium. Nd:YVO$_4$ is a high-gain material capable of efficiently converting pump light to output laser light. Nd:YVO$_4$ has a high coefficient of absorption and so absorbs laser diode pump radiation in a much smaller portion of the laser gain crystal than is typical of solid-state lasers like those using Nd:YAG as a gain medium. Particular advantages of this gain medium and of other high-absorption coefficient materials are discussed in previously identified U.S. patent application Ser. No. 08/792,374, filed Jan. 31, 1997, which discussion is hereby incorporated by reference, as well as the other high-absorption coefficient gain medium references discussed and incorporated by reference above. Other gain media having comparatively high-absorption coefficients might also be used, but Nd:YVO$_4$ has the advantage of having a high stimulated emission coefficient and short lifetimes for certain important excited states. Use of Nd:YVO$_4$ as the gain medium has immediate practical advantages for a pulsed laser system having a pulse repetition frequency in excess of 25 kHz or higher like those of preferred embodiments of the present solid-state laser. Particularly preferred embodiments of the present invention provide a side-pumped solid-state laser, with a generally rectangular-prism shaped gain medium having relatively small (about 1.8 mm×2 mm) transverse dimensions.

A high-absorption coefficient can, for purposes of discussion of aspects of the present invention, be defined by reference to a solid-state gain medium having an absorption coefficient at the pump wavelength such that absorption predominantly occurs over a distance smaller than the transverse dimension of the side-pumped solid-state gain medium. Preferably, the absorption coefficient of the gain medium is such that the 1/e point of the pump radiation intensity distribution within the gain medium is less than about 800 $\mu$m. A further aspect of the present invention uses a material like Nd:YVO$_4$ as a gain medium and tailors the absorption properties of the Nd:YVO$_4$ gain medium by altering the neodymium dopant concentration to achieve desired absorption and excitation characteristics. Preferred embodiments of solid-state lasers in accordance with the present invention typically use neodymium dopant concentrations of between about 0.5–1.5%, more preferably on the order of about 0.6–1.2% and most preferably the neodymium dopant concentration is approximately within the range of 0.9–1.1%.

Concentration preferably sets the peak absorption higher than a desired value. The value and pump wavelength tuning sets the absorption within a desired range of 200–2000 $\mu$m, more preferably 400–1000 $\mu$m, and most preferably within 600–800 $\mu$m (at the 1/e point).

Selection of an appropriate dopant concentration within the solid-state gain medium in accordance with preferred embodiments of the present invention tailors the absorption characteristics of the gain medium in a manner that facilitates the coupling of a desirable level of pump light into the desired laser gain mode. The solid-state gain medium is preferably a material like Nd:YVO$_4$ that fundamentally has a high-absorption coefficient for a range of wavelengths near the particular wavelength of light that most efficiently pumps the neodymium or other dopants within the vanadate or other host material. Selection of such a high-absorption coefficient gain medium facilitates efficient side pumping. To accomplish efficient side pumping in a practical laser system, it is very desirable to pump the gain medium with pump radiation that penetrates to a sufficient depth to reach the gain volume and which is highly absorbed within the gain volume. In preferred embodiments of the present invention, this is accomplished by selecting a gain medium whose absorption coefficient has a significant level of sensitivity to variations in the wavelength of pump light output by the semiconductor pump laser. For such embodiments, tuning of the pump laser's output wavelength alters the depth at which the pump radiation is primarily absorbed.

Figure 2:
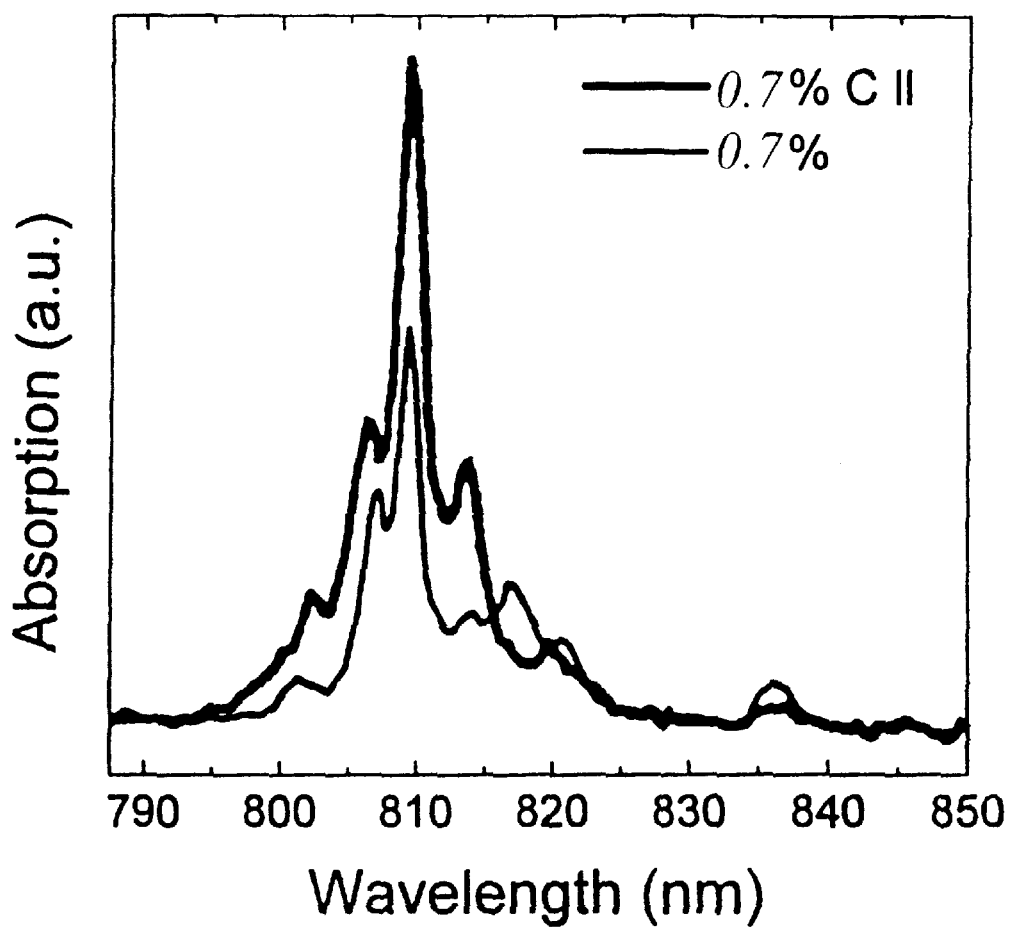
FIG. 2 schematically illustrates variations in the absorption coefficient of the preferred $Nd:YVO_4$ gain medium at different wavelengths of pump radiation along different directions within the $Nd:YVO_4$ gain medium.

FIG. 2 illustrates the range of absorption coefficient tuning possible within Nd:YVO$_4$ gain media by pumping with different wavelengths of light generated by altering the operating temperature of the preferred semiconductor diode pump laser. FIG. 2 is from Greg Mizell, et al., "Recent Developments in the Growth, Processing and Testing of Rare Earth Doped YVO$_4$ Single Crystals," SPIE Vol. 2115, Visible and UV Lasers, pp. 52–59 (1994). In particular, FIG. 2 schematically illustrates the empirical variations in the absorption coefficient of Nd:YVO$_4$ doped with neodymium to a one percent concentration for wavelengths of pump light ranging from 790 to 850 nanometers. Different relationships between the absorption coefficient and the pump light wavelength are observed for light directed parallel to the c-axis of the Nd:YVO$_4$ gain medium and for light directed perpendicular to the c-axis of the Nd:YVO$_4$ gain medium. Other curves are known for different concentrations of neodymium. A range of wavelengths of pump light (±3 nanometers) is typically selectable from commercially available semiconductor lasers simply by altering the operating temperature of the laser through adjustment of the cooling power of the Peltier refrigerator on which the semiconductor laser is mounted. It should be noted that other gain media, including Nd:YAG, also show variations in their absorption coefficients for varying wavelengths of pump light.

In comparison with most of those materials, Nd:YVO$_4$ is particularly desirable as a gain medium because the absorption coefficient of Nd:YVO$_4$ varies over a broader range of wavelengths of pump light. The comparatively weaker dependence of the absorption coefficient of Nd:YVO$_4$ on the wavelength of pump light allows for more precise selection of the desired absorption coefficient for Nd:YVO$_4$ as the gain medium, as compared to Nd:YAG or the like, and for more stability in the output of the solid-state laser under the expected minor variations in the temperature of the semiconductor laser during normal operation. It should be noted that both the shape of the absorption coefficient versus pump wavelength curve and the peak of that curve vary for different concentrations of neodymium in the preferred Nd:YVO$_4$ gain medium. It is very difficult to repeatedly produce Nd:YVO$_4$ crystals with precisely the desired quantity of dopant. Consequently, preferred embodiments of the present invention tune, by altering the operating temperature of a particular semiconductor pump laser, to achieve a desired distribution of pump light within a particular Nd:YVO$_4$ crystal in establishing the operating conditions for a particular solid-state laser. Of course, this optimization may be unnecessary if maximum power output or optical conversion efficiency is not required for the laser and may not be required if precise control and selection of the composition of the gain medium becomes available.

The thermal lensing properties of Nd:YVO$_4$ and other gain media requires accommodation in the selection of pump light distribution and design of the laser cavity when using Nd:YVO$_4$ as a gain medium for a solid-state laser. As is discussed in U.S. Pat. No. 5,577,060, entitled "Diode Pumped Laser Using Crystals with Strong Thermal Focussing," and in U.S. Pat. No. 5,651,020, entitled "Confocal-to-Confocal Diode Pumped Laser," each of which is hereby incorporated by reference, Nd:YVO$_4$ exhibits strong thermal lensing under typical high pump intensity operating conditions. The term "thermal lensing" is used in the art of solid-state lasers to describe phenomena in which the strong temperature dependence of the optical properties of solid-state gain media act to create a highly effective lens within the solid-state gain medium. Thermal lenses have similar properties to more conventional lenses, with the exception of the temperature dependence and the generally more distributed nature of the thermal lenses. In preferred embodiments of the present invention, the thermal lens that develops in Nd:YVO$_4$ under high pump intensities is much stronger than any other focusing optical element (i.e., mirror or lens) within the resonant cavity. For example, in the presently discussed embodiment of the laser system, the thermal lens will typically have a focal length, at full operating temperature and power, on the order of about four to five centimeters. The focusing power of the thermal lens makes the thermal lens typically a much stronger focusing optical element than any other element in the optical cavity. As will be apparent to a greater extent in the following discussion, preferred embodiments of the present invention utilize the strong thermal lens that develops in Nd:YVO$_4$ at normal operating conditions to stabilize the cavity of the solid-state laser. Consequently, the thermal lensing of the Nd:YVO$_4$ is a dominant factor in design of the solid-state laser's resonant cavity.

Thermal lensing may also be a consideration in establishing the optimal absorption coefficient of the Nd:YVO$_4$ gain medium and hence the optimal distribution of pump radiation within the Nd:YVO$_4$. Preferred embodiments of the present invention typically position the Nd:YVO$_4$ crystal so that the pump light is directed into the Nd:YVO$_4$ gain medium in a direction parallel to the a-axis of the Nd:YVO$_4$ crystal and provide at least one solid-state refrigerator (e.g., a Peltier or thermoelectric cooler) in contact with the other a-axis face of the crystal of the Nd:YVO$_4$. Nd:YVO$_4$ exhibits a temperature dependent birefringence such that heating the Nd:YVO$_4$ to normal (high pump intensity) operating temperatures establishes a strong birefringence within the crystal. This temperature dependent birefringence has been reported to create a strongly aberrated (distorted) thermal lens that focuses more strongly in the direction parallel to the a-axis than it does along the c-axis. A determination of the optimum absorption coefficient and optimum distribution of pump light within the Nd:YVO$_4$ gain medium would consequently have to accommodate the effects of the aberrated thermal lens.

The shape and focusing power of the thermal lens is very difficult to calculate, at least partially because one of the dominant effects in the system is that the laser light itself is an effective means of removing energy from the gain medium. Consequently, the overall energy balance equations are nonlinear. The practical implication of these characteristics of the preferred solid-state laser system is that, for a particular laser system having a particular Nd:YVO$_4$ crystal, a particular semiconductor laser, a preferred resonant cavity geometry, heat sinks, etc., the optimal operating condition for the particular laser system typically must be determined empirically. Certain aspects of the optimization would be apparent to and well within the skill of those of ordinary skill in the art. Other aspects of the optimization of a solid-state laser system in accordance with the present invention are distinct from the conventional concerns and these aspects are discussed in detail below. The optimal operating conditions for each particular laser are expected to be different from other solid-state lasers of similar, essentially identical construction.

Figure 3:
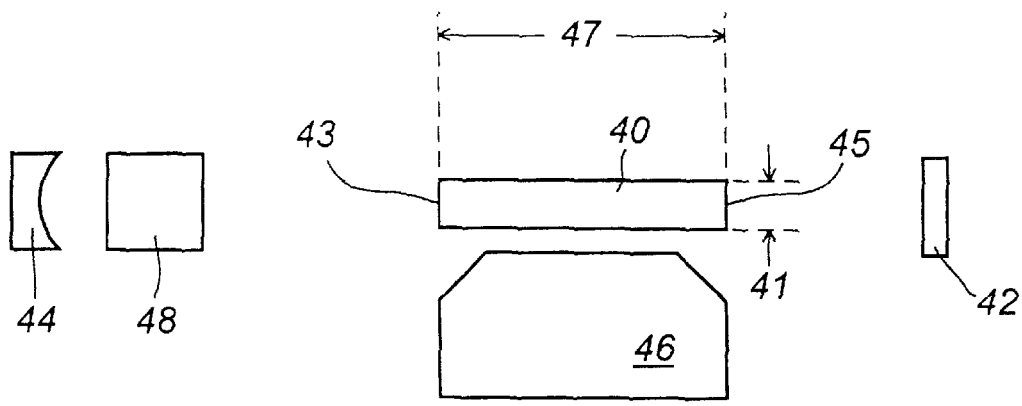
FIG. 3 schematically illustrates the arrangement of a semiconductor pump laser and solid-state gain medium within a resonant cavity.

The configuration and optimization of preferred embodiments of the present invention's solid-state laser will be better understood from the following description of a presently preferred configuration, illustrated in part in FIG. 3. A solid-state gain medium 40, preferably a Nd:YVO$_4$ crystal for the reasons already discussed, is provided within a resonant cavity defined by a high reflectivity mirror 42 and an output coupling mirror 44. Preferably, the Nd:YVO$_4$ crystal is mounted in thermal contact with a thermoelectric (Peltier) cooler of high capacity to maintain the Nd:YVO$_4$ crystal at a desired operating temperature. A semiconductor laser is positioned for side pumping the Nd:YVO$_4$ crystal, with the semiconductor laser preferably positioned on an independent thermoelectric cooler to maintain a selected operating temperature for the pump laser. This configuration of semiconductor diode laser array is commercially available from a number of vendors. Adjustment of the operating temperature of the semiconductor laser alters the output wavelength of the laser in a manner desired for the optimization of a solid-state laser in accordance with the present invention. Also shown in the cavity is a Q-switch 48, which is a particularly preferred element for pulsed operation of the solid-state laser, a preferred technique for achieving high levels of instantaneous output power from the laser.

Various types of semiconductor lasers are available and may be used in accordance with certain aspects of the present invention. For the highest levels of output from the solid-state laser, it is preferred to use a high output power semiconductor laser as a pump laser. The side pumping configuration is particularly preferred in accordance with the present invention to take advantage of what are presently the highest output semiconductor lasers. At this time, the preferred semiconductor pump lasers provide a high output power from an array of weakly coupled, discrete laser diode emitters distributed along the length of the semiconductor laser device. The illustrated embodiment uses as a pump laser 46 an SDL 3470, commercially available from Spectra Diode Laboratories of San Jose, Calif., which provides sixty emitters uniformly distributed over a one centimeter stripe with a total CW (continuous wave) output power of twenty Watts. Each emitter is a distinct diode with a width of about four microns and a height of about one hundred microns with each emitter spaced within the array along a line in the direction of the width of each diode. Each emitter produces an output that diverges horizontally (in the width direction), spreading at about a 15° angle (FWHM), and diverges significantly in the vertical direction (in the height direction), spreading at about a 35° angle (FWHM). The array of emitters faces on the solid-state laser crystal and the diverging outputs of the individual emitters along the horizontal direction combine to produce a bar of light of substantially uniform intensity along the horizontal direction. The solid-state laser crystal has a height of about 2.0 millimeters and a width 41 (or depth, viewed from the pump laser) of about 1.8 millimeters. Preferably, the solid-state laser crystal is sufficiently longer than the length of the semiconductor diode laser array as to not lose significant pump radiation by diffraction losses through the ends of the laser crystal 43, 45. For example, the gain medium 40 might be selected to have a length 47 of about 1.1–1.4 centimeters when used in combination with the one centimeter stripe of pumping radiation generated by the preferred SDL 3470 diode laser array. It may be desirable to provide an antireflection coating, effective for the output wavelengths of the semiconductor pump laser, on the face of the solid-state gain medium adjacent the semiconductor laser to improve the coupling of semiconductor pump light into the gain medium.

The solid-state laser crystal is preferably placed between two mirrors 42, 44 that together define the extents of the resonant cavity. The mirrors typically used to define the resonator cavity determine in part the shape of the resonant modes, although the thermal lensing action of the solid-state laser crystal during operation is a far more significant factor in determining the shape and volume of the laser gain modes. One boundary of the resonant cavity is defined by a substantially flat high reflector 42. Although the backside curvature of the high reflector is not typically a significant consideration, for an aspect of the present invention which allows a crude form of mode shape analysis, it is preferable to select the high reflector to be flat/flat, that is, flat on both the mirror side and on its backside. The cavity facing surface of the high reflector 42 may be flat, i.e., the mirror may have an infinite radius of curvature, or the high reflector 42 may have a very large radius of curvature (as compared to the length of the cavity) of about one meter (R=1 meters) or more. Generally, the high reflector is chosen to be reflective of 99% or more of the light incident on its surface at the fundamental laser gain wavelength of about 1064 nanometers. In most circumstances, the high reflector 42 has a multi-layer dielectric coating that is designed to be highly reflective at a wavelength of 1064 nanometers. In the illustrated preferred embodiment, the high reflector 42 has an infinite radius of curvature and its inner surface is spaced from the center of the laser crystal 40 by about 3.0 centimeters. An output coupler defines the other boundary of the resonant cavity. The output coupler 44 is the port from which laser light exits the resonant cavity and so is made to have a lower reflectivity than the high reflector. Preferably, the reflectivity of the output coupler 44 is chosen to optimize the power output of the laser in the desired lowest order (TEM$_{00}$) mode. In the illustrated embodiment, the output coupler is chosen to have a reflectivity of about 70–75%, although both higher and lower reflectivities may be preferred for variations on the illustrated structure. Commercially available high power laser mirrors with dielectric coatings that provide the desired reflective properties are used in the FIG. 3 laser embodiment for both the high reflector and the output coupler. The output coupler is generally also chosen to have a large radius of curvature of about one to five meters or more on its inner surface (i.e., the surface that faces the resonant cavity). In a presently preferred embodiment of the present invention, the outer surface of the output coupler is chosen to have an infinite radius of curvature (i.e., a flat outer surface). Use of a flat outer surface produces a slightly diverging output beam from the solid-state laser, which is generally useful in the overall system configuration of FIG. 1, where the fundamental laser beam has a diameter (2w$_0$) of about 2.5 millimeters at the surface of the first lens which focuses the fundamental infrared beam onto the surface of the first harmonic generating crystal. In certain other preferred embodiments of the present invention, the output coupler may be flat/flat with a similar level of transmission. A particular example of such a system is described below.

The inner reflective surface of the output coupler 44 is spaced from the center of the laser crystal by a distance of about six centimeters, so that the resonant laser modes inside of the laser cavity are asymmetric with respect to the laser crystal. The illustrated spacing allows sufficient room within the cavity to provide one or more additional optical elements. Most preferably, a Q-switch 48 is provided between the output coupler 44 and the gain medium 40. For the preferred Nd:YVO$_4$ gain medium, which has a high level of gain, lasing will occur before desired levels of pump energy are stored within the gain medium. The tendency of the gain medium to lase for low levels of pump radiation is counterproductive to the general goal of obtaining high levels of output intensity from the solid-state laser. Consequently, a Q-switch is placed within the resonant cavity of the solid-state laser to act as a switchable loss within the cavity. The Q-switch is operated so as to introduce a loss to the resonant cavity of a sufficient magnitude as to preclude lasing action during periodic intervals of the laser operation. The Q-switch operates with a duty cycle that causes the Q-switch to act as a lossy element in the cavity preventing laser action for a desired portion of each periodic interval. During the intervals in which the Q-switch is active as a loss element within the resonant cavity, lasing action does not occur. While the Q-switch is active as a loss element, the inversion population within the gain medium increases from the pumping action of the pump diode more quickly and increases to higher levels than if the Q-switch or some other source of loss were not present within the resonant cavity. When the Q-switch is not active as a loss element, lasing action proceeds quickly to remove the energy stored in the gain medium, producing a short duration, high instantaneous intensity laser pulse.

Laser action is initiated in a laser including a Q-switch by switching the Q-switch to a state in which the Q-switch does not operate as a loss element or at least the Q-switch introduces a comparatively low level of loss to the gain cavity. When the Q-switch is switched to its relatively low loss state, the level of loss within the resonant cavity is preferably reduced to a level at which laser gain and laser action rapidly proceeds. During these intervals of reduced losses within the cavity, energy is quickly withdrawn from the inversion levels within the gain medium and lasing action occurs to produce output light characterized by a large instantaneous power level and a high intensity. The increased levels of energy storage obtained through use of the Q-switch are rapidly depleted, reducing the laser gain and reducing the output intensity. As such, the Q-switch is left in its low loss state only for brief periods of time after which the Q-switch is reactivated as a high loss element and storage of the pump energy commences once again within the gain medium. In the illustrated embodiment, it is preferred that the Q-switch is an acousto-optic element such as a TeO$_2$ crystal driven by a piezoelectric element mounted on the crystal. Such devices are commercially available. The Q-switch itself is about 1.0 centimeters long and the center of the Q-switch is spaced from the front surface of the output coupler by a distance of about one centimeter.

Setting an appropriate pulse repetition frequency (PRF) may take into consideration the desired output intensity of the solid-state laser and the characteristics of the gain medium, including the lifetimes of the relevant excitable states within the particularly preferred gain medium. Particularly preferred embodiments of a solid-state laser in accordance with the present invention utilize a pulse repetition frequency (PRF) of about 25 kHz. A PRF of 25 kHz switches the Q-switch between its high loss and low loss states producing solid-state laser output pulses at a rate of 25 kHz, which is nearly optimal for laser performance and characteristics. When the solid-state laser of FIG. 3 is used, on the other hand, in an overall system with distinct performance characteristics and concerns, those characteristics and concerns may take precedence in establishing the desired operational characteristics of the pulsed laser system. For example, when the laser of FIG. 3 is incorporated in a harmonic generation system like that illustrated in FIG. 1 and the overall system is used within a stereolithographic apparatus, the performance demands of the stereolithographic apparatus may be the most important consideration in establishing the operating pulse repetition frequency. For some embodiments of the present invention, it is preferred that the solid-state laser of FIG. 3 be operated at a PRF of about 22.2 kHz and other particularly preferred embodiments at a PRF of about 40 kHz. These frequencies are well suited for some of the stereolithographic apparatuses that are target applications of preferred embodiments of the present invention.

The preferred spatial relationship between the semiconductor pump laser 46 and the gain medium 40 is an important consideration for some aspects of the present invention.

Figure 4:
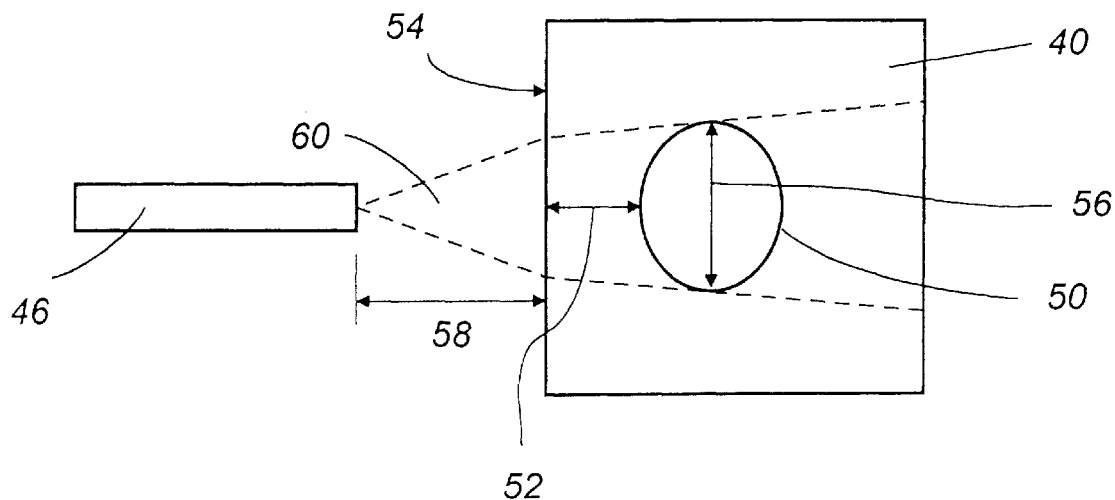
FIG. 4 illustrates, in schematic cross-sectional view, considerations for the placement of a laser mode volume within a gain medium and for placement of a pump laser with respect to the mode volume.

As a preliminary to a discussion of this relationship, however, it is first necessary to discuss the positioning of the laser gain mode within the solid-state laser gain medium. Referring now to FIG. 4, the gain medium 40 and the semiconductor laser 46 are both shown in cross-sectional elevation view. In this view, the lowest order laser $TEM_{00}$ mode 50 is schematically shown in cross-section and is indicated in FIG. 4 by level line 50 which may represent a $1/e^2$ level line for the intensity distribution in the mode. Some investigators have asserted that the mode 50 will be compressed along the horizontal axis due to the thermal birefringence effects produced by thermal lensing of the $Nd:YVO_4$ gain medium 40. While the present inventors have not observed the reported ellipticity of the laser mode, the laser mode 50 is illustrated as having a non-circular level line to indicate that there is little reason to conclude that the laser mode will have a precisely circular shape. To couple a high level of pump radiation into the preferred highly absorptive $Nd:YVO_4$ gain medium, it is desirable to arrange the cavity mirrors 42, 44 (FIG. 3) with respect to the gain medium so that the resonant mode 50 is positioned at or adjacent the face of the gain medium 40 through which the pump radiation is provided.

On the other hand, it is desirable that the cavity mirrors 42, 44 not be positioned to cause the resonant mode 50 to be too near the surfaces of the gain crystal, including the face through which the gain medium is pumped. The illustrated $TEM_{00}$ mode 50 has a generally Gaussian shape, with a portion of the intensity distribution of the mode extending beyond the illustrated $1/e^2$ level line shown in FIG. 4. Should the mode volume 50 be positioned too close to the pump face of the $Nd:YVO_4$ gain medium 40, the diffractive losses through the face of the crystal may be unacceptably large and may limit the high power operational characteristics of the FIG. 3 laser. Even though there is little energy in the outer portion of the mode distribution (the "tail"), that energy nevertheless affects the diffraction properties of the laser. As such, it is preferred in the described system and geometry to position the laser mode so that the level line of the laser mode is spaced at least about 200 $\mu$m away from the edge of the gain medium to limit the diffraction losses to an acceptable level. Acceptable levels of diffraction losses might be defined by reference to the level of distortion introduced into the mode by the diffraction losses through the face of the gain medium. For a given set of mirrors and thermal lensing action, the laser mode will have a bulk size and power distribution if the mode is positioned far from all surfaces of the gain medium. If the laser cavity is arranged close enough to a surface of the gain medium to experience significant diffraction losses through the surface, then the laser mode will be distorted, whether in size, energy distribution or other characteristics. Unacceptable levels of diffraction losses are present, in at least some embodiments, when the laser mode is not significantly distorted from the bulk mode size and power distribution. By way of a practical example, the diffractive losses reported in the Alcock patent and the high diffractive loss geometry reported in the Alcock patent make high-gain operation difficult for a solid-state laser and so represent an unacceptable level of diffraction losses. Consequently, preferred embodiments of the present invention arrange the gain cavity, through the positioning of the cavity mirrors 42, 44 with respect to the gain medium 40, so that the laser mode is spaced from the face 54 of the crystal through which the mode volume is pumped. Preferably, the separation 52 between the $1/e^2$ level line of the mode volume 50 and the face 54 of the gain medium is sufficient to make the diffractive losses through the face 54 small, at least smaller than 20% and more preferably smaller than 10% per round trip, compared to the other losses in the gain cavity. Furthermore, the spacing should not be so large that too little pump radiation reaches the laser mode volume. This may be accomplished by providing a separation 52 on the order of 200–300 $\mu$m, although this distance will vary somewhat depending on how well the mode volume is confined and other particular characteristics of the system. Different laser configurations may exhibit different preferred spacing characteristics. Preferably, the mode is spaced from a pumping surface by a distance that allows at least 50% of incident pump radiation to reach the depth of the mode. Different concentrations of dopants within the gain medium also affect the diffraction losses and the selection of a proper spacing for limiting diffraction losses and for optimizing laser mode position within a high-absorption coefficient material.

Given the desired spacing between the gain mode 50 and the face 54 of the gain medium, the spacing between the pump laser 46 and the laser crystal 40 is then provided to match the vertical extent of the pumping radiation with the height 56 of the mode volume. Conventional techniques for providing pump radiation into the gain medium include butt coupling in which the semiconductor laser is spaced close to or in contact with the face of the gain medium that is pumped. A simplistic butt coupling geometry is not preferred in embodiments of the present invention as it sometimes may require that the gain mode be moved to a position deeper within the gain medium, resulting in poor pumping efficiency due to the high-absorption of the gain medium. Preferred embodiments of the present invention instead match the position of the pump laser to the height of the mode volume fixed at a depth within the gain medium, taking into account the complex optical and thermal environment of the laser system.

Another geometry conventionally practiced in side pumped lasers uses a cylindrical lens, often a fiber lens, to collimate the output of the semiconductor pump laser prior to providing the pump radiation to the gain medium. Through careful selection of the focusing optics, it might be possible to achieve a level of matching between the laser mode height and the vertical extent of the pump beam within the laser gain medium. Such a configuration is, however, prone to losses at each surface of the collimating and beam shaping optics and increases the difficulty of aligning the overall laser system to achieve and maintain optimized operating conditions. In addition, without the adjustment possibilities of varying the spacing between a laser mode having a fixed position and a diverging pump beam, it may be very difficult to approach even a moderately optimized pumping environment for an individual laser. As discussed above, it is expected that each laser will have distinct operating characteristics and so will require separate optimization. The fiber lens configuration is designed to produce a single height of pump beam and so will typically be a poor tool for the optimization of a laser system.

Preferred embodiments of the present invention space the semiconductor pump laser 46 from the face 54 through which the gain medium 40 is pumped by a distance 58 chosen in accordance with the vertical divergence angle 60 of the output of the pump laser 46, the index of refraction of the gain medium (for the preferred $Nd:YVO_4$, n=1.9) and a simple application of Snell's law to match the vertical extent of the pump laser output light at the mode volume to the height 56 of the mode volume. On the other hand, the desired positioning derived from a simple application of Snell's law is not practical because the mode size cannot be calculated accurately due to thermal lensing in the material. Thermal lensing within the gain medium is a function of pump efficiency and total pump power, as discussed previously. As a practical matter then, the most desirable spacing 58 between the pump laser 46 and the face 54 of the gain medium 40 typically must be empirically determined. Preferred embodiments of the present invention accordingly perform an empirical adjustment of the spacing to achieve desired output characteristics, with illustrative results set forth in the following Table. Table I illustrates the output power of the laser system as a function of the separation distance between the diode laser and the Nd:YVO$_4$ laser gain medium.

TABLE I

| Separation, Pump to Gain Medium ($\mu$m) | 1064 nm Multimode Power (W) | 1064 nm TEM$_{00}$ Power (W) | 532 nm Power (W) |
| --- | --- | --- | --- |
| 150 | 4.8 | 1.7 | 0.48 |
| 300 | 4.5 | 2.5 | 0.75 |
| 450 | 4.0 | 1.5 | 0.40 |
| 500 | 3.5 | 1.2 | 0.30 |

For the multimode measurement listed in the second column of Table I, the FIG. 3 laser's resonant cavity is tuned for maximum total energy output in the infrared, without regard to mode quality. For the single mode TEM$_{00}$ output values listed in the third column of Table I, the cavity is instead optimized to obtain the maximum frequency doubled output (column four, Table I) from the infrared laser in the system of FIG. 1. In other words, the FIG. 3 laser is optimized to produce the maximum green light at 532 nanometers at the exit from the second harmonic generation crystal 20 in the FIG. 1 system. As is discussed below, maximizing the output of frequency doubled light is an extremely sensitive measurement of the mode quality of the laser that can be used to maximize the TEM$_{00}$ output of the laser. It is important to appreciate that the optimum spacing 58 in the FIG. 4 laser is not necessarily determined by maximizing the total output power from the solid-state laser. Depending on the particular application in which the solid-state laser is used, it may instead be preferable to select the maximum power output for a particular mode, such as the TEM$_{00}$ mode. Specifically, it is preferred when the FIG. 3 laser is used in the system of FIG. 1 that the spacing 58 be selected to maximize output power from the TEM$_{00}$ mode.

The semiconductor laser is spaced from the pump face of the gain medium so that the beam of light output by the semiconductor laser is matched to the laser mode within the gain medium. As illustrated in Table I, there will be an optimum distance associated with a maximum in the power output from the laser system. In a preferred embodiment of the invention, the semiconductor laser is spaced from the gain surface through which the gain medium is pumped by a distance within 150 $\mu$m of the distance that provides a maximum output from the system.

In some preferred embodiments, matching is not defined in terms of a physical matching of height, as noted above, and instead matching is defined by maximizing the laser system output for a given optical configuration by varying only the spacing between the pump source and gain medium. Matching may, in some embodiments, be said to occur when output power is within about 50% of the maximum value of output power observed at the optimum spacing. More preferably, matching is said to occur when the output power is within about 20% of the maximum value and still more preferably, matching may be said to occur when the output power is within about 10% of the maximum output power. In the most preferred embodiments, matching is identified as being a particular separation or set of operational characteristics that provide the maximum output power within the measurement errors characteristic of the power measurement process and in view of mechanical manufacturing tolerances. It should be noted that variations in output power could be dramatic even for systems very close to the optimum operating conditions. Thus, laser output power can be reduced to one-half for comparatively small variations from the optimum configuration. Additionally, the normal use of a laser system in an industrial environment is expected to cause the laser to vary from its optimum operating condition.

For optimal performance of embodiments of the FIG. 1 system that include a solid-state laser as illustrated in FIG. 3, the FIG. 3 solid-state laser should provide a single TEM$_{00}$ mode for input to the doubling crystal 26 because of the compact size of the TEM$_{00}$ mode. All higher order output modes that might be produced by the solid-state laser have larger lateral (cross-sectional) extents and so cannot be focused to as small of a spot size as the lowest order TEM$_{00}$ mode. The TEM$_{00}$ mode can be focused to a small spot size and will retain its small diameter for a larger distance than other, higher order modes. Thus, the TEM$_{00}$ mode most efficiently couples energy into a small volume within the doubling crystal. The output from the frequency doubling operation varies approximately as the line integral over the Rayleigh length of the square of the optical intensity. Consequently, a narrowly focused beam of light that retains its smaller diameter over a greater distance, such as is provided if the input beam is a high quality single TEM$_{00}$ mode, provides a significant advantage for increasing the output from the doubling crystal. Conversely, the power output from a doubling crystal can also serve as a sensitive measure of the mode quality of the laser beam input to the doubling crystal. The sensitivity of doubled power output as a measurement of beam quality is illustrated by the measurements provided in the third and fourth columns of Table I for an optimized configuration of the solid-state laser of FIG. 3. Of course, if less optimization can be tolerated for a given application, use of higher order modes may be acceptable.

Figure 5:
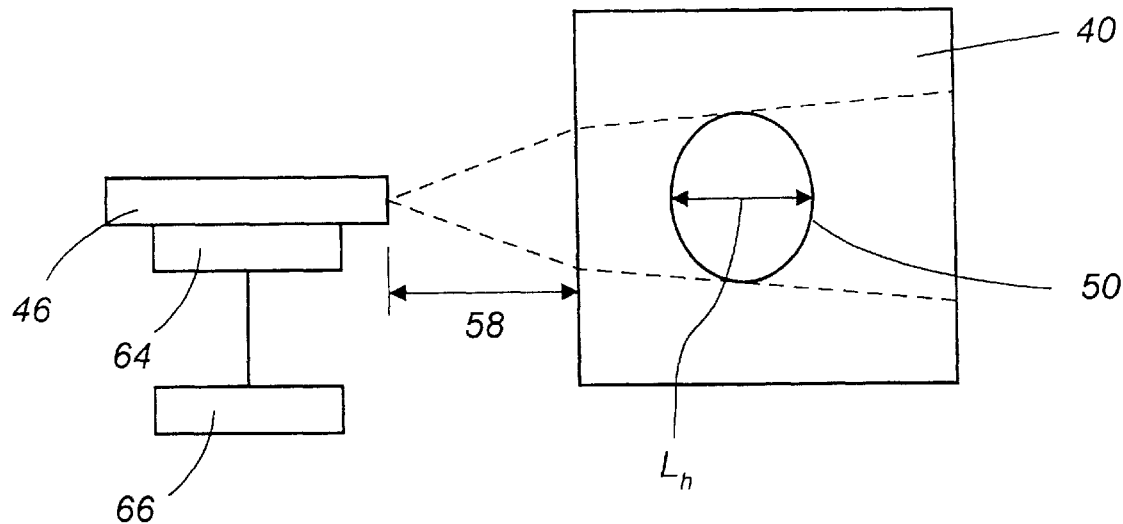
FIG. 5 illustrates, in schematic cross-sectional view, a laser mode volume within a high-absorption coefficient gain medium and considerations for the selection of the gain medium's absorption coefficient and the wavelength of the pump laser for the position of the laser mode volume.

The discussion with respect to FIG. 4 presents a first set of considerations for the optimization of the solid-state laser system. Another set of considerations for the optimization of the solid-state laser system is illustrated in FIG. 5. As noted previously, the position of the gain mode 50 within the gain medium 40 is preferably selected to balance the goal of limiting diffraction losses against the reduction of pump beam intensity at increasing depths within the gain medium. For a given pump source position and gain medium position located relative thereto, the position of the other cavity components can be varied until a maximized output is obtained from the system, thereby setting the optimal location which balances diffraction loss and the loss of pump beam intensity. This position is preferably selected in the manner discussed above. Further and distinct optimization is accomplished by tailoring the amount of pump radiation that is coupled into the laser mode.

Optimization of the amount of pump light that is coupled into the gain mode takes into consideration a number of different factors, including the particular high-absorption coefficient material used as a gain medium and the doping level of the excitation species within the gain medium. For the presently preferred embodiments of the present invention, the gain medium is Nd:YVO$_4$ and the neodymium doping level is selected to be about 1%. It is difficult to reproducibly dope Nd:YVO$_4$ with precision. Accordingly, there will generally be variations in the amount of neodymium in each particular Nd:YVO$_4$ crystal. These variations are accommodated and matching of the pump excitation to the gain mode 50 may be accomplished by selecting the operating temperature of the semiconductor laser, as is illustrated in FIG. 2 and is discussed above in the corresponding portion of the text. The semiconductor laser 46 is mounted on a temperature control device 64, typically a thermoelectric or Peltier refrigerator. A controller 66, often a part of an overall control system for a laser system like that of FIG. 1, is provided to set and maintain the temperature of the semiconductor laser 46 using the temperature control device 64. It is preferred that the crystal have a doping level which produces a peak absorption coefficient greater than that desired for the pump radiation. In such a case, it is preferred that the temperature of the semiconductor pump laser is selected so that the pump laser outputs light at a wavelength typically different from the peak absorption wavelength of the gain medium. Such detuned operation ensures that the pump light penetrates to a greater depth within the gain medium, providing a higher level of light coupling into the TEM$_{00}$ gain mode.

Figure 6:
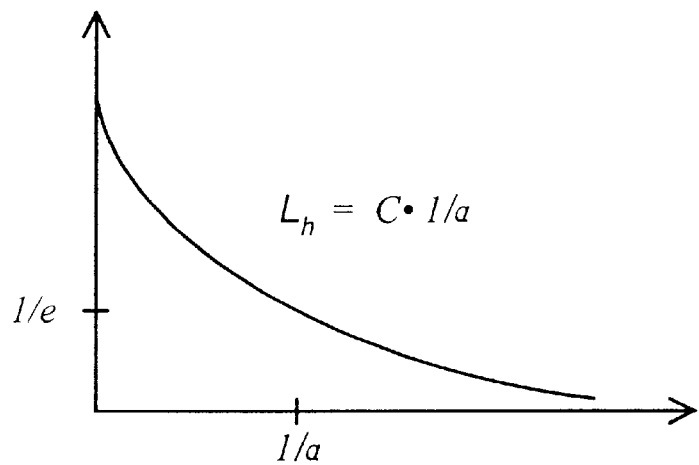
FIG. 6 illustrates the absorption characteristics of light output by the preferred semiconductor diode laser source within the preferred $Nd:YVO_4$ gain medium.

The width of the gain mode 50, indicated as L$_h$ in the figures, is a strong function of the pump beam intensity and thermal lensing of the Nd:YVO$_4$ gain medium 40. Consequently, the optimization of the coupling of pump light into the gain mode is again a task which practicality presently demands be accomplished empirically. As with other aspects of the optimization of the illustrated laser system, the extent to which these optimization procedures are necessary will depend on the particular application and the output intensities demanded by those applications. FIG. 6 illustrates schematically the absorption of pump light as a function of depth within the gain medium. As illustrated, the 1/e point of energy absorption corresponds to the inverse of the absorption coefficient $\alpha$. The present inventors have observed that the preferred laser mode width L$_h$ generally varies with the inverse of the absorption coefficient, and the ultimate laser system is selected so that the proportionality constant "c" illustrated in the figure is in the range of between 0.5 and 2.0.

Optimization of the performance of the solid-state laser may involve the adjustment of different aspects of the laser configuration and different operational parameters. Optimization is typically performed empirically, that is, in an experimental fashion with successive local optimums identified by monitoring the output power or another performance characteristic of the laser while adjusting the solid-state laser configuration or operational parameters. Each variable is typically adjusted individually and then further adjustments are made to optimize other parameters. Since all of the laser's characteristics affect and are in turn affected by the thermal lens within the gain medium, high levels of optimization may require an iterative optimization process. Thus, in some embodiments of the invention, the position of the laser mode within the gain medium might be selected by adjusting the position of the mirrors with respect to the gain medium (e.g., to achieve a local maximum of a value close thereto). A match between the height of the laser mode and the height of the laser beam at the laser mode is next established (e.g., to achieve a local maximum or a value close thereto), preferably by adjusting the gap between the semiconductor laser and the gain medium. Most preferably, monitoring the output power of the frequency doubled laser beam when the solid-state laser is installed in the laser system of FIG. 1 provides the measure identifying the optimum gap. Adjusting the operating temperature of the semiconductor laser might then set the level of light coupled to the laser mode (e.g., to obtain a local maximum or a value close thereto) in a third step of an optimization process. Some or all of the laser optimization sequence might then be repeated. It may be desirable, for example, to readjust the mirror position relative to the gain medium, thereby moving the laser mode relative to the pump surface of the gain medium to obtain better output power levels.

The entire sequence optimization steps might be repeated until a desired level of optimization is obtained. A lower threshold limitation on performance improvement might be used to identify when optimization is complete. For example, the optimum laser configuration and parameters might be identified by a complete sequence of optimization procedures not improving output power by more than 10% or, in other circumstances, by more than 5%. This optimization evaluation, for example, might be made on the basis of the output power in the fundamental wavelength laser beam or in the frequency doubled laser beam. In some cases, it may be necessary only to repeat only some of the various optimization steps in the overall optimization of the laser system. The most desirable levels of optimization for certain laser applications might well require (1) the optimization of the laser mode position within the gain medium, (2) the matching of the physical extent of the pump radiation to the laser mode, and (3) the matching of the distribution of the pump radiation to the laser mode. In certain circumstances, it may only be necessary to obtain matching, as measured by near local maximum output power levels, for individual ones of the three specific characteristics listed above.

Figure 7:
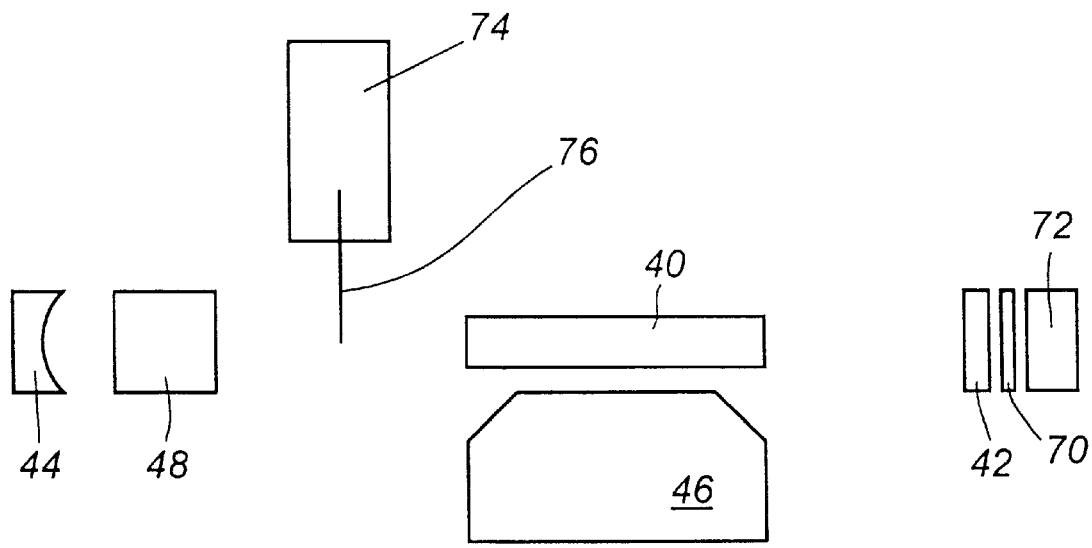
FIG. 7 illustrates a modification of the FIG. 3 laser adapted for measuring the profile of a mode volume within the laser of FIG. 3.

FIG. 7 shows a modification of the laser system of FIG. 3 to provide a mode shape analyzer that can be used in optimizing additional characteristics of the laser system. The system illustrated in FIG. 7 takes advantage of the fact that a small portion of the laser radiation incident on the high reflectivity mirror 42 passes through that high reflectivity mirror. Because the high reflectivity mirror 42 is flat/flat, the image of the laser beam on the outer surface of the high reflectivity mirror 42 is a reproduction of the beam shape at the high reflectivity mirror within the cavity. This beam image can thus be observed to analyze the mode shape within the cavity. Because the intensity of the laser beam that passes through the high reflectivity mirror is strong enough to damage detectors, one or more neutral density filters 70 may be positioned adjacent the high reflectivity mirror 42 to produce a more manageable beam intensity. The beam is then imaged using a detector array of desired resolution or a profile analyzer such as a Melles Griot Beam Analyzer 72, which is sensitive to the near infrared light of the laser beam. The analyzer 72 can be positioned relatively closely (about 1.5 cm) to the high reflectivity mirror 42. This imaging capability can readily be used to view the shape of the beam and thus to determine whether the laser is operating in or near the TEM$_{00}$ laser mode. This viewing method is far less precise than the optimization technique described above which maximizes the frequency doubled output of the doubling crystal 20 in the FIG. 1 system.

The FIG. 7 analyzer can be used to give crude, broadly qualitative measurements of the size of the mode at different portions of the laser system. A micromanipulator or microtranslation stage 74 is used to precisely position a knife or razor edge 76 with respect to the gain mode. The stage is placed at a position along the length of the cavity and the razor edge is translated laterally until the edge 76 first begins distorting the image at analyzer 72, typically observed by the mode image beginning to shrink. The edge 76 is translated until the image at analyzer 72 is extinguished to indicate that the edge is blocking something approaching the entire mode cross section. The distance between the initial disruption of the beam and the extinction of the gain mode is generally related to the width of the mode at that point. It is important to note that the laser of the FIG. 7 system is in high power operation when this system is being used, so it is critical that the razor edge be kept safely away from the laser crystal 40. Using the FIG. 7 system, the approximated mode width within a laser system optimized for operation in the $TEM_{00}$ mode was measured at different positions within the approximately nine centimeter long laser cavity of the discussed embodiment. Near the high reflectivity mirror 42, the mode width was approximately 400 $\mu$m; at a distance of one centimeter from the high reflectivity mirror the mode width was approximately 560 $\mu$m; at a distance of 7.5 centimeters, which corresponds to the normal position of the Q-switch 48 in the cavity, the mode width is approximately 230 $\mu$m; and near the surface of the output coupler 44, the mode width is approximately 130 $\mu$m. Consequently, it is apparent that the gain mode is largest at the gain medium 40 and is smallest at the output coupler. The FIG. 7 system is useful not only for analyzing the mode shape and size for the optimized laser operating in the $TEM_{00}$ mode, the system can also be used in identifying the existence of higher order modes and in devising schemes for limiting the existence of higher order modes.

Appropriate lateral positioning of the Q-switch 48 within the resonant cavity's optical path can act like an aperture in forcing the solid-state laser to single mode operation. Higher order cavity modes exhibit lobes symmetrically positioned around the centerline of the volume occupied by the fundamental $TEM_{00}$ mode. The first higher order mode, when viewed in cross section through the resonant cavity, includes a pair of lobes spaced in the horizontal direction on either side of the fundamental mode volume so that a first of the lobes is spaced nearer to the pump light and the second lobe is spaced farther from the pump light. Due to the exponential distribution of the pump radiation over the distance between the first and second lobes, the first lobe is positioned in a high-gain region and the second lobe is positioned in a low gain region of the cavity.

Adjustment of the gain profile can prevent the second lobe from having sufficient gain to sustain laser action. In conjunction with this adjustment, the Q-switch is preferably positioned so that the first lobe of the first higher order mode of the resonant cavity does not fall on the face of the Q-switch while all of the fundamental $TEM_{00}$ mode volume falls on the face of the Q-switch. As such, the first lobe of the first higher order mode will not be transmitted through the Q-switch, resulting in high losses or physical blockage of the first lobe so that the first lobe will not have sufficient gain to sustain laser operation. Thus, the first higher mode of oscillation for the solid-state laser can be suppressed by adjusting the gain profile and positioning the Q-switch to suppress the first higher order mode. Second and further higher order modes of oscillation are usually less accessible for oscillation, and so the combination of gain profile selection and Q-switch positioning can effectively select single $TEM_{00}$ mode operation for some embodiments of the solid-state laser. While similar results may be obtained by carefully tuning the cavity, the combination of gain profile selection and Q-switch positioning is preferred in certain applications as more robust and more certain to maintain single mode operation without adjustment of the laser. Such low maintenance operation characteristics are very important to the practicality of the solid-state laser design for use in industrial applications and in applications such as stereolithography.

A still more robust combination of physical and gain apertures can be used in a similar manner. Rather than use the Q-switch as the physical aperture, a distinct aperture positioned near the Q-switch can be used to block one lobe of the first higher order mode of the laser. For this alternative, the physical aperture may be a knife edge or any suitable blocking material. In a manner similar to the Q-switch discussion presented above, the physical aperture should be placed to block the lobe of the first higher order mode that is nearest to the pump source. For proper design of the laser system, the gain in the second lobe of the first higher order mode can be too low to sustain laser action. The gain for the second lobe is sufficiently low if the round trip gain for the first higher order mode is less than the round trip losses in the laser. As necessary, the pump beam wavelength, gain medium absorption coefficient or another loss mechanism can be adjusted to ensure this low gain condition. The combination of a physical aperture and gain selection may provide more flexibility in the configuration of the laser system than the combination of gain selection with the Q-switch as aperture.

Figure 8:
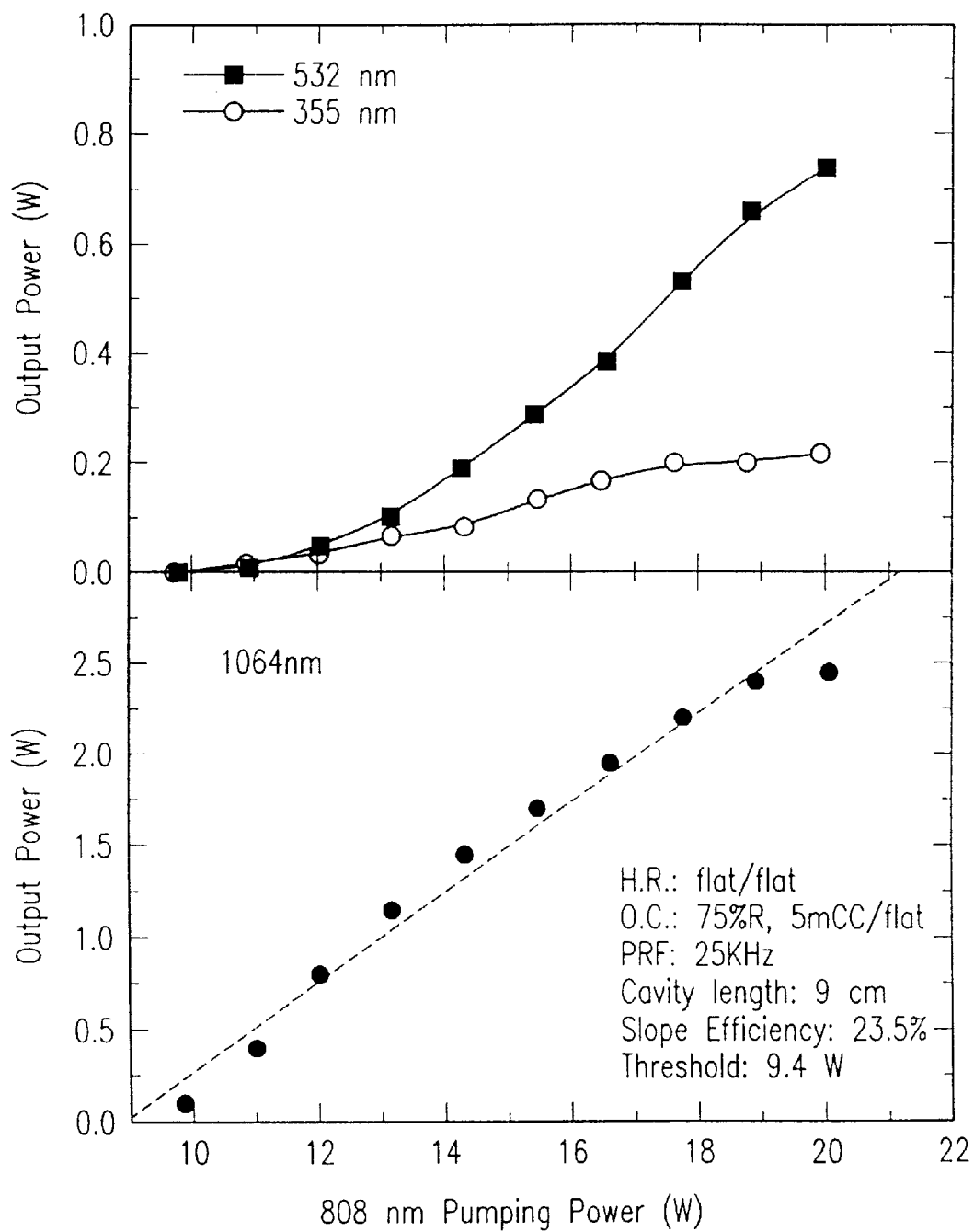
FIG. 8 illustrates performance characteristics of the FIG. 3 laser for the production of fundamental 1064 nm laser light and performance characteristics of the FIG. 1 laser system for the production of doubled and tripled output light with the FIG. 1 laser system.

FIG. 8 illustrates the performance of the above-described embodiments of the laser system of FIG. 3 configured and optimized in accordance with the teachings of the present invention, as well as the performance of the system of FIG. 1 incorporating an optimized FIG. 3 laser. FIG. 8 provides graphs of fundamental laser output, doubled laser output (532 nm) and tripled laser output (355 nm) obtained using a PRF (pulse repetition frequency) of 25 kHz. The graph of fundamental laser output power represents an optical to optical pumping efficiency of about 12% with a slope efficiency of over 20% (23.5%), each of which is high for a side pumped laser. The threshold for laser action is about 9.5 Watts input power when the cavity, including the mirrors, is optimized for operation at 20 Watts input pumping power. The threshold for laser action in this configuration reflects the amount of input thermal power that is necessary to set up and stabilize the thermal lens. Prior to approaching this steady state operating condition, the thermal lens is not sufficiently developed and light propagating within the cavity tends not to remain within the cavity. Significant levels of tripled output light are obtained in this laser system, making the present system suitable for the stereolithography applications discussed above.

For high levels of power output from the FIG. 1 system, it is possible that the energy density at the output face of the third harmonic crystal 26 may be sufficient to damage the output face of the third harmonic crystal. The present inventors have observed damage to the output face of the third harmonic crystal, with damage occurring only at the output face of the crystal and with the damage highly localized near the position where the laser beams leave the crystal. As such, it is very likely that the damage is associated with the presence of a high density of 355 nanometer photons (tripled frequency, ultraviolet) at the output face of the crystal. If the damage were arising simply from the total energy density, then damage should also be observed at the doubling crystal or at the input face to the tripling crystal of the FIG. 1 system. The observed damage is limited in scope essentially to the spot size of the beams leaving the crystal, which is on the order of one hundred microns in diameter, but the position of the damage necessarily interferes with the tripled frequency beam quality and intensity. The damage to the output face of the tripling crystal may significantly reduce the lifetime of laser systems like that illustrated in FIG. 1.

Figure 9:
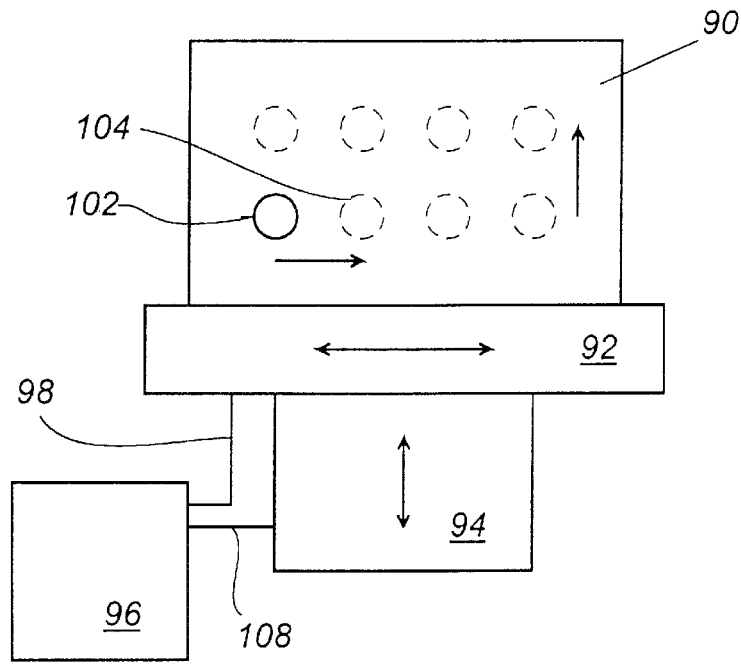
FIG. 9 illustrates a modified harmonic generation crystal having extended lifetime characteristics.

FIG. 9 presents a simple accommodation that may be substituted within the FIG. 1 laser system to increase the lifetime of a laser using a tripling crystal to generate high levels of ultraviolet output light. FIG. 9 shows a modified assembly that may be substituted for the tripling crystal 26 of the FIG. 1 embodiment, with the FIG. 9 assembly including a LBO crystal 90 functionally identical to the tripling crystal 26 illustrated in FIG. 1 and discussed above. For the purposes of this discussion and illustration, certain peripheral components such as temperature control mechanisms required by the tripling crystal are not shown for greater clarity in the explanation. The tripling crystal 90 is preferably mounted on a computer controlled translation mechanism, though manual control translation mechanism could be made to work, preferably having both lateral and vertical movement capabilities. An x-axis translation stage 92 may be provided as a support for the LBO crystal and will provide lateral movement of the LBO tripling crystal 90 within the laser cavity. A z-axis translation stage 94 or elevator is provided, for example below the x-axis stage, to provide vertical translation of the LBO crystal with respect to the laser cavity. This provides a system with two-dimensional translation and hence the longest life for the harmonic generation crystal. Of course, if a single dimension of translation provides satisfactory results, only a single translation mechanism might be provided and translations might be performed only along a single direction. The translation mechanisms are controlled by a control system or computer 96, which may be dedicated to the control of a laser subsystem like that illustrated in FIG. 1, or which may be a portion of the overall control computer system for a stereolithographic apparatus. Preferably, the computer 96 is connected to a sensor or optical sampling system positioned within the overall laser system of FIG. 1 to allow the computer 96 to determine the output intensity of the laser system in the ultraviolet or derive another measure of the output intensity from the tripling crystal. Computer 96 is connected to the x-axis translation stage 92 through a data control line 98 and computer 96 is connected to the z-axis translation stage 94 through a data control line 108.

The subsystem illustrated in FIG. 9 allows for the automatic repositioning of the tripling crystal 90 with respect to the position of the laser beams at the output face of the tripling crystal. For example, during an initial installation, the tripling crystal 90 may be positioned with respect to the laser cavity so that the beam passes through an initial spot 102. After a period of time, the tripling crystal may be moved with respect to the laser cavity so that the laser beams pass through a new spot 104. With the laser beams exiting the tripling crystal at a position spaced from the earlier occupied position, any damage present at the earlier occupied position will not affect the repositioned beam. Since the tripling crystal is large (~2–5 mm) in comparison to the diameter (~100 $\mu$m) of the beams at the output face of the tripling crystal, many such moves can safely be made on any given crystal. Consequently, the useable life of the tripling crystal, or any similar crystal that might be damaged from exiting radiation, can be significantly extended. In addition, while this modification has been discussed within the context of the FIG. 1 system in which the ultraviolet producing harmonic generation crystal is positioned external to the laser cavity, the same strategy can be applied to a laser system in which a harmonic generation crystal within a laser cavity is repositioned to extend the life of the harmonic generation crystal within the laser cavity. It should be noted that at least some laser systems use doubling and higher order harmonic generation within a laser cavity and that such laser systems may generate ultraviolet or other damaging radiation. Such systems likely could benefit from the movement of the harmonic generation crystals.

Depending on the particular needs of the laser system or other larger system considerations, the repositioning of the tripling crystal with respect to the input laser beams can be triggered in a number of different ways. Most simply, the user upon noticing degradation in performance could trigger a repositioning operation in which the tripling crystal is moved so that the laser beams pass through a portion of the crystal previously unused and undamaged. While simple, this strategy may be counterproductive as a practical matter, since there may be a tendency for the user to associate all performance problems with degradation of the tripling crystal and may make unproductive adjustments to the position of the tripling crystal. Consequently, it is desirable for the FIG. 9 embodiment to include a memory that stores the last one or two or more occupied positions of the tripling crystal. If, after a repositioning operation there is little or no improvement in laser performance (i.e., under 10% or even 20% improvement), the repositioning operation could be reversed so that the tripling crystal occupies the previous position. The ability to recover the previously occupied position is desirable not only for this relatively manual configuration of the FIG. 9 tripling crystal assembly, but also in the more automated configurations discussed below. In an alternative, it would be possible for more than one forward step be made to check for improvements, after which if improvements are not found the system could be made to automatically or manually step back through previous positions.

As an alternative to the relatively manual repositioning operation discussed above, a memory may be provided that stores the total hours of operation for the FIG. 1 laser system either within the computer 96 or accessible to the computer 96. The time period for performing the positioning operation can be stored within the computer 96 in a preset style based on the manufacturer's knowledge of performance and lifetime characteristics. Alternately, the time for repositioning can be made settable by the user based on the user's experience with the laser system in the user's target applications. For these and other embodiments of the repositioning system, it may be desirable to store a history of all of the positions through which the laser beams passed through the history of a particular tripling crystal. Such systems perform repositioning operations in a manner that first checks the history of previously occupied positions and performs repositioning to avoid previously occupied positions.

Under other further automated configurations of the FIG. 9 tripling crystal assembly, decisions as to whether repositioning operations are performed may be based on external measurements of the output intensity or beam quality. In such configurations, an output power sensor is provided for the FIG. 1 laser system. Such an output power sensor could sample total power output from the tripling crystal or the tripled (or quadrupled) ultraviolet output power. In some cases, it may be acceptable to measure the output power of the fundamental and doubled beams along the beam path 34 in FIG. 1. The judgment as to whether the tripling crystal has been damaged may be based on beam power measurements made for both paths 32 and 34. A baseline output power level is measured and stored after installation and optimization of a tripling crystal. At regular time intervals, the output power of the laser system is measured and the computer 96 compares the current output power level to the historical baseline power level. The computer triggers a repositioning operation if the current output power level falls below a predetermined fraction of the baseline level. After the repositioning operation, the output power level is measured once again. If the output power level returns to its previous level, or sufficiently close to the previous level, then the new output power level is stored in the memory as a new baseline level and new position is accepted. If the output power at the new position is not acceptable, the tripling crystal may be returned to its previous position. The computer 96 may then issue a signal indicative of the need for the running of system diagnostics or other service.

Figure 10:
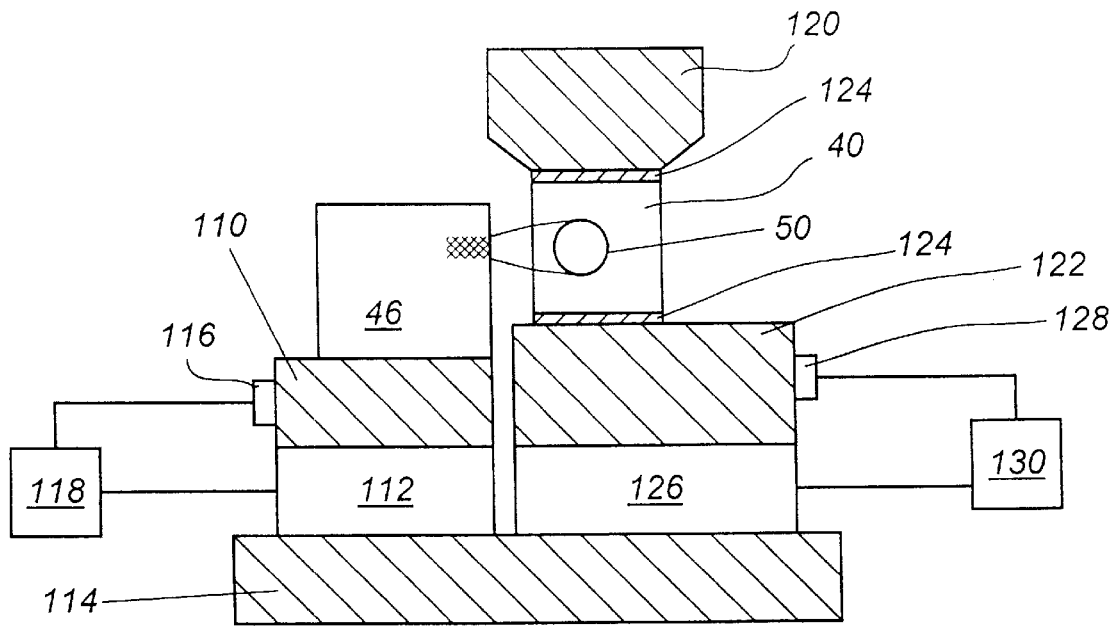
FIG. 10 illustrates in increased detail an assembly of a semiconductor diode laser array positioned adjacent a solid-state gain medium.

Another modification to the basic laser system is illustrated in FIG. 10, which provides a more detailed sectional view of the semiconductor diode pump laser 46 and the gain medium 40 than is provided in FIG. 5 above. In some embodiments of the assembly of the semiconductor laser 46 and the gain medium 40, both the semiconductor laser and the gain medium may be mounted on the same block (e.g., copper) and cooled together. For such a system, the semiconductor laser and the gain medium will operate at the same temperature. The present inventors have observed, on the other hand, that it can be advantageous to maintain the semiconductor diode laser and the gain medium at different temperatures. FIG. 10 schematically shows an assembly of a semiconductor laser 46 and a Nd:YVO$_4$ gain medium 40 that allows the semiconductor laser and the gain medium to be maintained at different temperatures during operation.

In the FIG. 10 assembly, the semiconductor diode laser is mounted on a copper block 110 that transfers heat generated within the diode laser efficiently away through a thermoelectric (Peltier) refrigerator 112. The waste heat from the thermoelectric refrigerator 112 is transferred to a significantly more massive copper block 114 or other form of reservoir that efficiently transfers heat from the system without impeding the cooling operation of the thermoelectric refrigerators in the illustrated assembly. A temperature sensing diode or resistor 116 may be mounted on the copper block 110 to provide a measurement of the temperature of the semiconductor laser 46. A controller 118 is connected to the temperature sensor 116 and the thermoelectric cooler 110, with the controller 118 controlling the current flow through the thermoelectric cooler to maintain the temperature of the semiconductor laser 46 at a desired level. Gain medium 40 is mounted between copper cooling blocks 120 and 122 using a malleable thermal conductor 124 such as indium foil or another soft metal foil. The copper block 120 may have a fin structure for radiative cooling or the copper block may dispose of heat generated within gain medium 40 through a thermoelectric refrigerator (not shown). Copper block 122 is mounted on a thermoelectric refrigerator 126 that withdraws heat from the gain medium 40 and dissipates the heat into the thermal reservoir 114. Temperature sensor 128, which could be a diode or a resistor, provides a measure of the temperature of the gain medium. Controller 130 receives a signal indicative of the temperature of the copper block 122 and controls the current flow through the thermoelectric refrigerator 126 to control the temperature of the gain medium.

An overall system computer coupled to the controllers 118 and 130 allows entry of the particular temperature at which the semiconductor laser and the gain medium are to operate. Most preferably, the operating temperature of the semiconductor laser is set to optimize the coupling of pump light into the laser mode. Then the operating temperature of the gain medium is selected to optimize output power. For the system described here, using the diode array and gain medium discussed above, one advantageous configuration sets the temperature of the semiconductor pump laser at 25° C. and sets the temperature of the gain medium at about 18° C. for a laser operating at a pulse repetition frequency of about 40 kHz. It might be preferred to cool the gain medium still further, but condensation might undesirably form on the gain medium if the temperature of the gain medium were kept too low. The illustrated and described assembly of semiconductor diode array pump laser and gain medium having independent temperature control was implemented in a laser as illustrated in FIG. 3 above. The particular laser used in this implementation provided a flat high reflector 42 with a cavity facing surface spaced from the center of the gain medium by a distance of about 2.86 cm. The output coupler 44 is flat/flat with a transmission of between about 70–75% and a cavity facing surface spaced from the center of the gain medium 40 by a distance of about 4.3 cm. This laser was operated at a pulse repetition frequency (PRF) of 40 kHz. This independent temperature control laser exhibited output power levels and efficiencies approximately twice as high as the earlier discussed embodiment.

The independent temperature control laser is in other aspects essentially the same as the earlier discussed first laser system. As with the first embodiment discussed above, this independent temperature control laser uses a modified butt coupling configuration in which no optics are provided between the semiconductor pump laser and the gain medium. A separation is provided between the semiconductor laser and the gain medium. Cavity mirrors are situated in relation to the gain medium so as to position the laser mode adjacent the face of the gain medium through which the gain medium is pumped. The laser mode is spaced from the pump face by a distance appropriate to limit the diffraction losses of the laser mode through the pump face, but not too deep within the high-absorption coefficient gain medium as to unnecessarily limit the amount of pump light that reaches the laser mode. An operating temperature of the semiconductor laser is selected to optimize the coupling of pump light into the laser, typically by selecting an output wavelength for the pump laser that is different from the peak of absorption of the gain medium.

Figure 11:
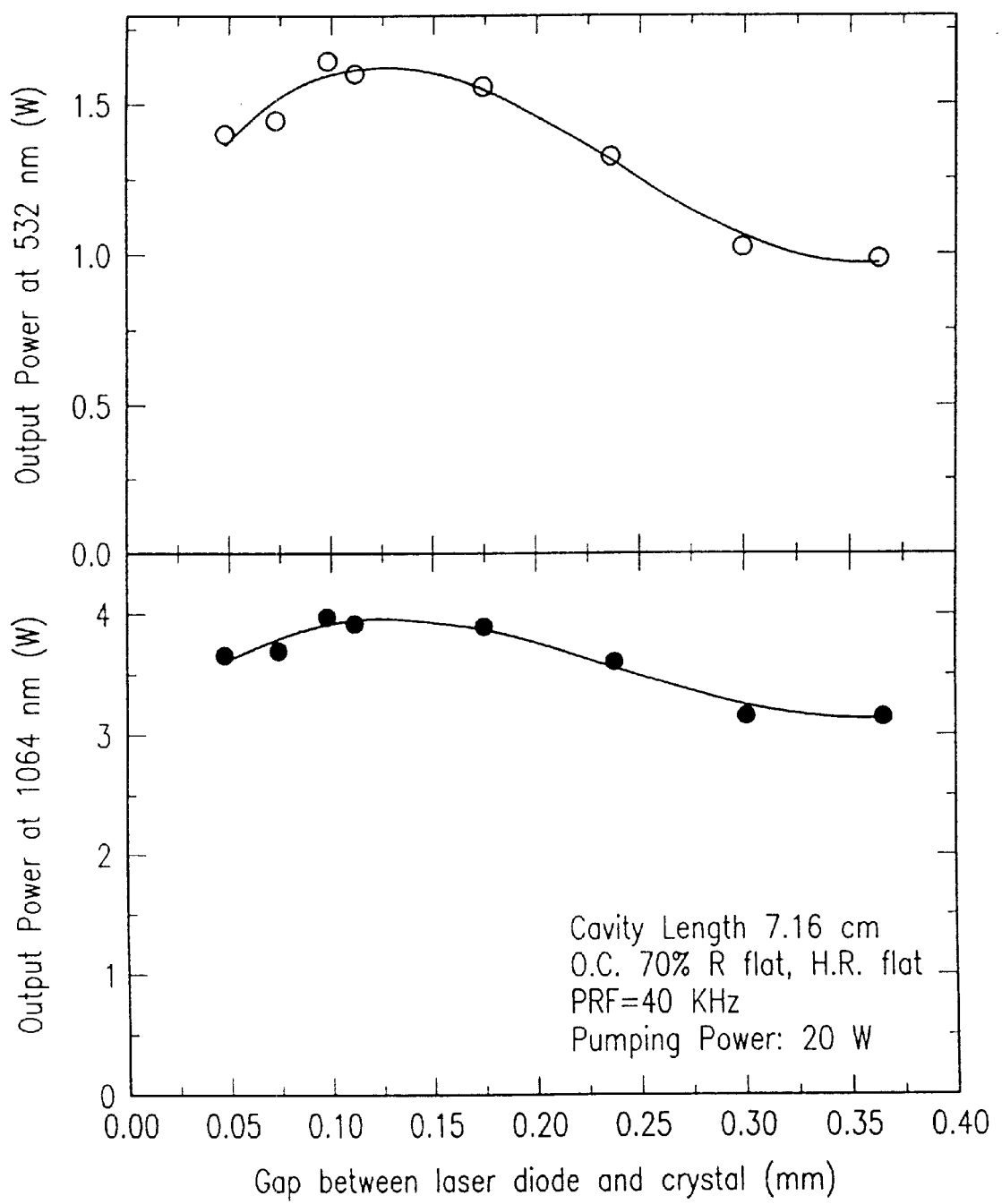
FIG. 11 illustrates optimization of the gap between a laser diode array and a gain medium in a side pumped configuration consistent with the illustration of FIG. 3.

The optimal separation between the semiconductor laser and the gain medium is determined in the manner discussed above. That is, the separation is selected by optimizing the output power in the lowest order TEM$_{00}$ fundamental wavelength (1064 nm) laser beam, preferably using empirical methods. Preferably this optimization is performed by maximizing the output power in the frequency doubled (532 nm) laser beam which, as is discussed above, is a very sensitive measurement of the TEM$_{00}$ mode quality of the laser beam. FIG. 11 illustrates the relationship between the gap between the semiconductor laser and the output power in the fundamental and frequency doubled laser beams. As illustrated, the peak in the frequency doubled output power as a function of gap or separation is more strongly peaked than the comparable relationship for the output power of the fundamental laser beam. This demonstrates that the frequency doubled output power provides a more sensitive measurement for optimizing the gap or separation than the output power for the fundamental wavelength laser beam.

Table II below lists the output power in the fundamental (TEM$_{00}$) wavelength laser beam as a function of the separation between the semiconductor laser and the gain medium, for the FIG. 10 laser with the semiconductor laser held at 25° C. and the gain medium held at 18° C. Table II also shows the relationship between the output power in the fundamental ($TEM_{00}$) and frequency doubled laser beams and the conversion efficiency between the fundamental and frequency doubled beams, when the FIG. 10 laser with independent cooling is provided in an embodiment of the laser system of FIG. 1. In the following table, the listed output powers for the fundamental ($TEM_{00}$, 1064 nm) wavelength laser beam represent the values obtained by optimizing the cavity for each separation value for a predetermined input pump laser power of 20 W.

Figure 12:
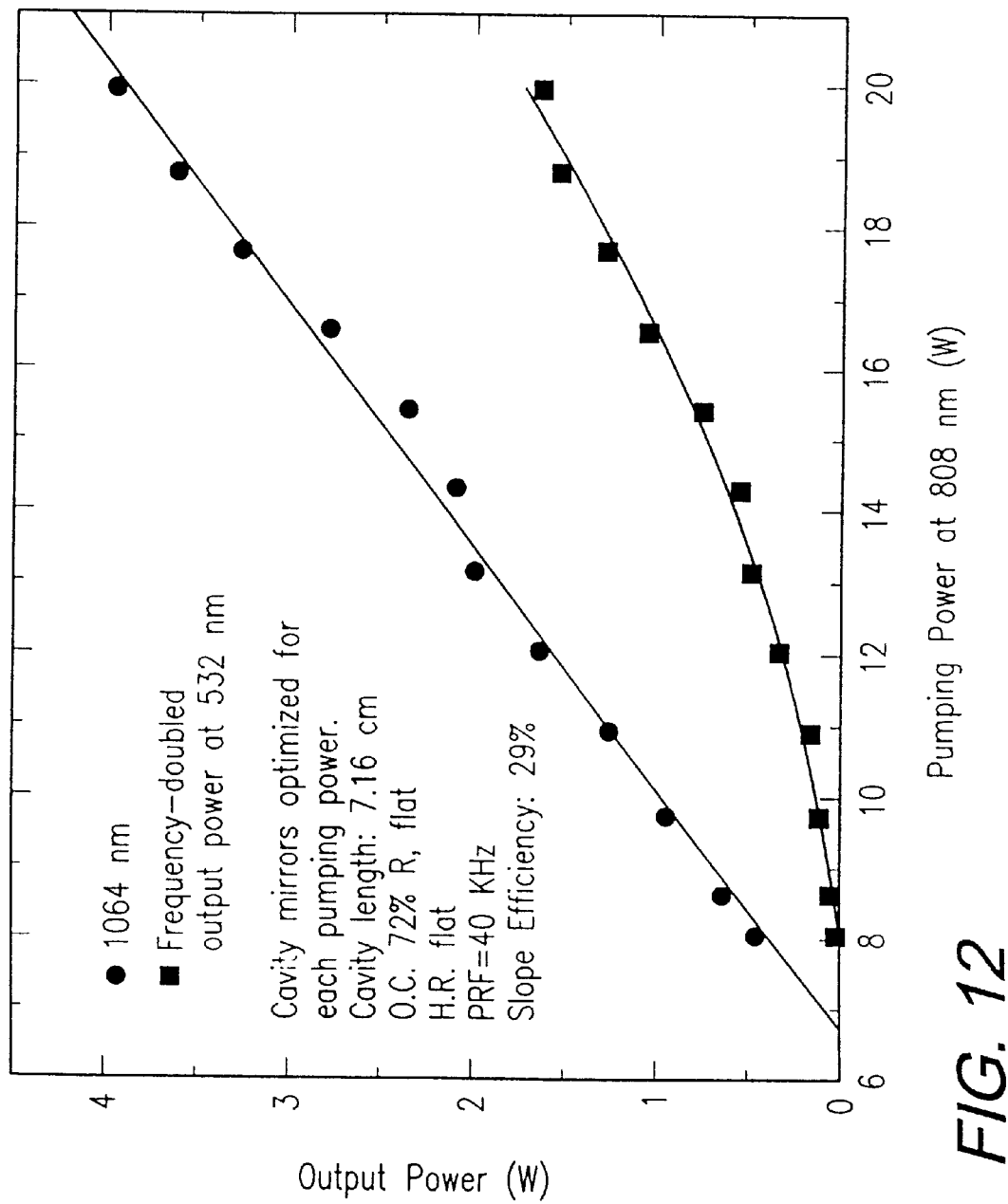
FIGS. 12–13 illustrate performance characteristics of a solid-state laser, having differential cooling characteristics, for the production of fundamental 1064 nm laser light and the performance characteristics of the FIG. 1 laser system for the production of doubled and tripled output light using such a solid-state laser system.
Figure 13:
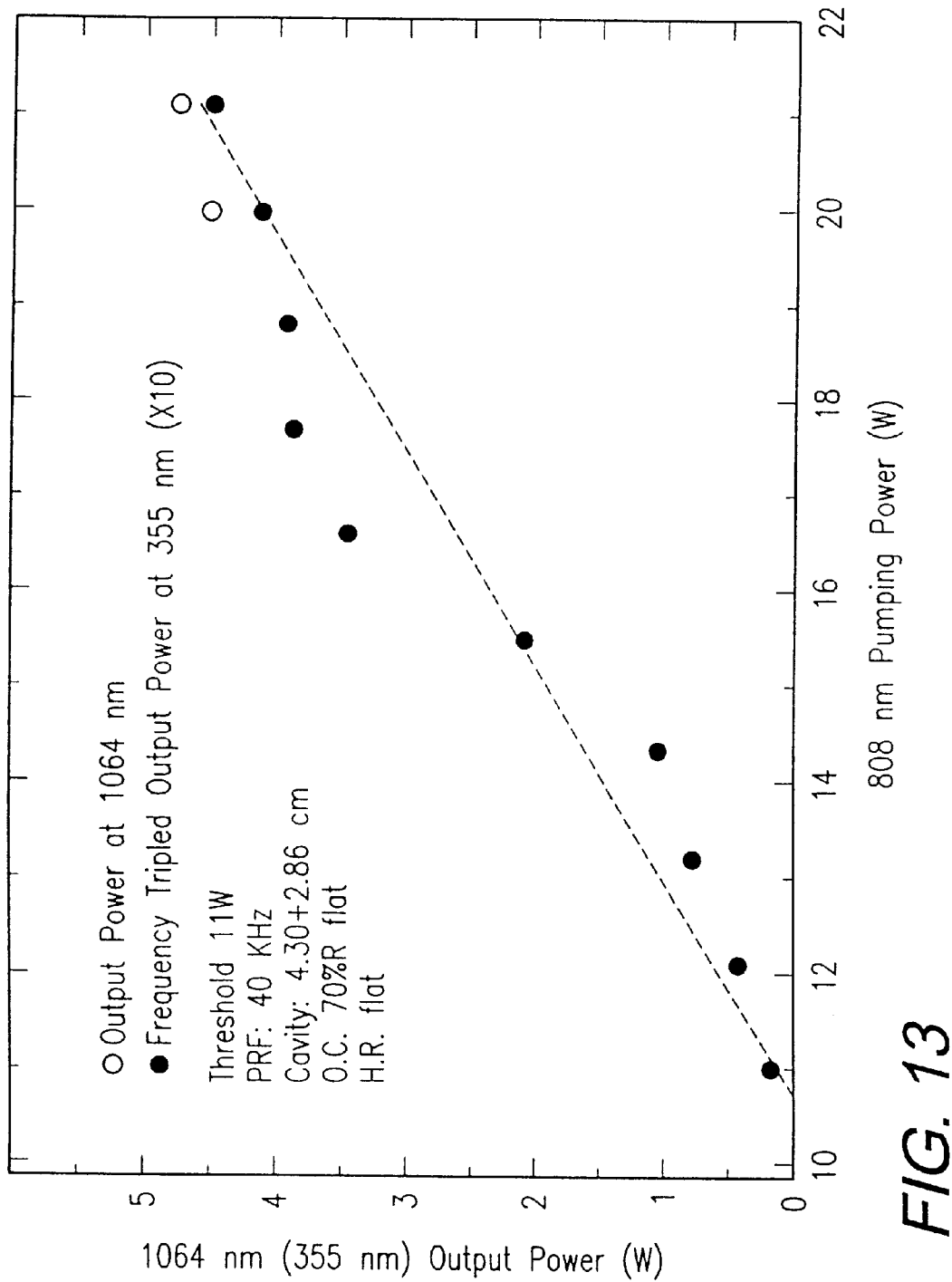

FIGS. 12 and 13 provide further illustration of the performance of this laser system. The performance characteristics of this laser are illustrated in FIGS. 12 and 13 and can be compared to the performance of the first-discussed laser as illustrated in FIG. 8. Comparison of these two lasers illustrates the improved performance associated with the independent setting of the temperature of the semiconductor laser and the gain medium.

TABLE II

| Separation, Pump to Gain Medium (μm) | 1064 nm $TEM_{00}$ Power (W) | 532 nm $TEM_{00}$ Power (W) | 1064 nm to 532 nm Conversion Efficiency (%) |
|---|---|---|---|
| 48 | 3.70 | 1.40 | 37.8 |
| 73 | 3.72 | 1.45 | 39.0 |
| 98 | 4.02 | 1.65 | 41.0 |
| 111 | 3.96 | 1.60 | 40.4 |
| 175 | 3.92 | 1.56 | 39.8 |
| 238 | 3.65 | 1.33 | 36.4 |
| 302 | 3.20 | 1.04 | 32.5 |
| 365 | 3.20 | 1.00 | 31.3 |

The prior discussion of preferred embodiments typically referred to the lasing medium as being a solid-state medium. In some alternative embodiments, it is believed that other lasing media might be usable, for example gases, dyes, and the like.

The prior discussion of preferred embodiments typically referred to the pump source as being a semiconductor or diode laser. In some alternative embodiments, it is believed that other pump sources might be usable, for example discharge lamps, flash lamps, other lasers, and the like.

The prior discussion of preferred embodiments typically referred to the mirrors of the laser cavity being spaced from the lasing medium and from a Q-switch or other modulating device that may be located within the cavity. In alternative embodiments, it is possible that the cavity mirrors be directly coated or otherwise mounted onto either end of the lasing medium. In a further alternative, the lasing medium and modulating device may be joined, one cavity mirror coated or otherwise mounted on or adjacent to the end of the lasing medium opposite the modulating device, and the other cavity mirror coated or otherwise mounted on or adjacent to the modulating device.

The prior discussion of preferred embodiments typically assumed a particular orientation of the laser system as a whole, but the other orientations of the system are possible. In particular, the disclosure typically described the laser as having a horizontal optical axis. Instead of considering this optical axis as being horizontal, it is possible that it extend in any other direction. This optical axis may be considered to extend along a first direction that may have any desired orientation. This first direction in turn may be used to define various pairs of directions that are transverse thereto. These pairs of transverse directions are typically considered to be perpendicular to each other, as well as perpendicular to the first direction.

Additionally, the prior description of preferred embodiments typically considered the laser system to be pumped along a first transverse direction that was considered to be located within a horizontal plane. As described above, the pump radiation is considered to travel along this first transverse direction so as to impinge upon the lasing medium in a side pumped configuration. In fact, however, since the pump radiation typically diverges along both the optical axis (to a lesser extent) and along a second transverse direction (to a greater extent), the pumping radiation is not typically limited to traveling along this first transverse direction. In typical applications, however, the pump radiation may be considered to have an averaged or mean propagation direction that is substantially parallel to this first transverse direction. More generically speaking, the mean propagation direction of the pump radiation may be considered to be oriented along a second direction that has a component that is parallel to the first transverse direction. In the most preferred embodiments, the second direction is parallel to or within about five or even ten degrees of this first transverse direction. The second direction may further be considered as the depth direction as pump radiation may be considered to be absorbed along this direction as it penetrates to varying depths in the lasing medium. From the above comments it should be understood that neither the first transverse direction nor the second direction need to be orientated within a horizontal plane.

Furthermore, in the prior description of the preferred embodiments, the pump radiation was typically considered to diverge along a vertical direction. In terms of these embodiments, the vertical direction is typically considered to be oriented along a second transverse direction that is perpendicular to both the first transverse direction and the optical axis. The second transverse direction may be labeled as a third direction. It should be understood that this third direction need not be vertically oriented.

The present invention has been described in terms of certain preferred embodiments thereof. Those of ordinary skill in the art will appreciate that variations from the particular system described here may be made without altering the teachings of the present invention. Some of these variations are described explicitly here, while others have not been explicitly described in the interest of providing a concise description of the present invention. For example, while the above description has been set forth in terms of a single diode array semiconductor pump laser positioned along one side of the gain crystal, the teachings of the present invention could be applied to a modification in which a pair of semiconductor pump lasers are positioned on either side of a gain medium. In such a modification, the gain medium would be selected to be sufficiently narrow as to efficiently couple the light from both sources into the gain mode. The present invention therefore is not to be limited to any particular embodiment described, but instead the scope of the present invention is to be determined by reference to the claims, which follow.

What is claimed:

1. A laser system comprising:
 a laser cavity having an optical axis passing through the laser cavity;
 a solid-state gain medium having a first transverse direction that is substantially perpendicular to the optical axis, the solid-state gain medium within the laser cavity and the optical axis passing through the solid-state gain medium; and
 at least one semiconductor laser having an output, the at least one semiconductor laser positioned to direct a beam of light through a pump surface of the gain medium to pump the gain medium, with the beam of light diverging at least in the first transverse dimension, the beam of light from the at least one semiconductor laser pumping a laser mode within the gain medium to produce solid-state laser output, the laser cavity defined so that the laser mode is spaced from the pump surface of the gain medium, and the at least one semiconductor laser provided adjacent a face of the solid-state gain medium so that the beam of light output by the at least one semiconductor laser matches the laser mode.

2. The laser system of claim 1, wherein the at least one semiconductor laser is spaced from the face of the solid-state gain medium by a first distance.

3. The laser system of claim 2, wherein no focusing optics are provided between the at least one semiconductor laser and the face of the solid-state gain medium.

4. The laser system of claim 3, wherein the optical axis passes through the laser mode and through opposite ends of the gain medium, and wherein the laser cavity directs the laser mode along the optical axis in a direction parallel to the pump surface of the gain medium.

5. The laser system of claim 3, wherein the first distance provides a maximum output from the laser system for a particular output power of the at least one semiconductor laser.

6. The laser system of claim 3, wherein the first distance is within 50 μm of a position that corresponds to the maximum output from the laser system for a particular output power of the at least one semiconductor laser.

7. The laser system of claim 6, wherein the temperature of a surface of the gain medium is maintained at a temperature lower than a temperature of a surface of the at least one semiconductor laser.

8. The laser system of claim 3, wherein the first distance is within 100 μm of a position that corresponds to the maximum output from the laser system for a particular output power of the at least one semiconductor laser.

9. The laser system of claim 3, wherein the first distance is within 150 μm of a position that corresponds to the maximum output from the laser system for a particular output power of the at least one semiconductor laser.

10. The laser system of claim 8, wherein the temperature of the gain medium is maintained at a temperature approximately equal to a temperature of the at least one semiconductor laser.

11. The laser system of claim 3, wherein the first distance is such that an output of the solid-state laser is within 10% of the maximum output power for a given set of laser configuration and operational parameters.

12. The laser system of claim 1, wherein the beam of light output by the at least one semiconductor laser matches the laser mode to provide an output power from the solid-state laser within 50% of the maximum output power of the solid-state laser for a given set of laser configuration and operational parameters.

13. The laser system of claim 1, wherein the beam of light output by the at least one semiconductor laser matches the laser mode to provide an output power from the solid-state laser within 20% of the maximum output power of the solid-state laser for a given set of laser configuration and operational parameters.

14. The laser system of claim 1, wherein the beam of light output by the at least one semiconductor laser matches the laser mode to provide an output power from the solid-state laser within 10% of the maximum output power of the solid-state laser for a given set of laser configuration and operational parameters.

15. The laser system of claim 1, wherein a height of the beam of light output by the at least one semiconductor laser matches a vertical extent of the laser mode at a position of the laser mode within the gain medium.

16. The laser system of claim 15, wherein no focusing optics are provided between the at least one semiconductor laser and the face of the solid-state gain medium.

17. The laser system of claim 1, further comprising a harmonic generating apparatus that receives the laser mode output and outputs a shorter wavelength output.

18. The laser system of claim 17, wherein the harmonic generating apparatus is a frequency doubling crystal and the shorter wavelength output is a frequency doubled laser beam.

19. The laser system of claim 18, wherein the frequency doubling crystal is LBO.

20. The laser system of claim 17, wherein the laser system is pulsed at a pulsed repetition frequency (PRF).

21. The laser system of claim 20, wherein the laser system is a stereolithographic apparatus.

22. The laser system of claim 21, wherein the PRF is greater than or equal to about 40 kHz.

23. The laser system of claim 21, wherein the PRF is greater than or equal to about 22.2 kHz.

24. The laser system of claim 18, wherein the first distance provides a maximum power for the frequency doubled laser beam for a particular output power of the at least one semiconductor laser.

25. The laser system of claim 18, wherein the first distance is within 50 μm of a position that corresponds to a maximum power for the frequency doubled laser beam for a particular output power of the at least one semiconductor laser.

26. The laser system of claim 25, wherein the temperature of the gain medium is maintained at a temperature lower than a temperature of the at least one semiconductor laser.

27. The laser system of claim 18, wherein the first distance is within 100 μm of a position that corresponds to the maximum power in the frequency doubled laser beam for a particular output power of the at least one semiconductor laser.

28. The laser system of claim 18, wherein the first distance is within 150 μm of a position that corresponds to the maximum power in the frequency doubled laser beam for a particular output power of the at least one semiconductor laser.

29. The laser system of claim 27, wherein the temperature of the gain medium is maintained at a temperature approximately equal to a temperature of the at least one semiconductor laser.

30. The laser system of claim 18, wherein the first distance is such that an output of the solid-state laser is within 10% of the maximum power in the frequency doubled laser beam for a given set of laser configuration and operational parameters.

31. The laser system of claim 18, wherein the beam of light output by the at least one semiconductor laser matches the laser mode to provide an output power in the frequency doubled laser beam within 50% of the maximum for a given set of laser configuration and operational parameters.

32. The laser system of claim 18, wherein the beam of light output by the at least one semiconductor laser matches the laser mode to provide an output power in the frequency doubled laser beam within 20% of the maximum for a given set of laser configuration and operational parameters.

33. The laser system of claim 18, wherein the beam of light output by the at least one semiconductor laser matches the laser mode to provide an output power in the frequency doubled laser beam within 10% of the maximum for a given set of laser configuration and operational parameters.

34. The laser system of claim 3, wherein the first distance is selected to provide a maximum output in a lowest order laser mode of the laser system for a particular output power of the at least one semiconductor laser.

35. The laser system of claim 2, wherein the first distance is selected to provide a maximum output in a $TEM_{00}$ mode from the laser system for a particular output power of the at least one semiconductor laser.

36. The laser system of claim 3, wherein the first distance is between approximately 100–10,000 $\mu$m.

37. The laser system of claim 3, wherein the first distance is between approximately 100–500 $\mu$m.

38. The laser system of claim 1, wherein the gain medium receives pump light only from one side.

39. The laser system of claim 4, wherein the laser mode is spaced from the pump surface of the gain medium by a distance that reduces diffraction losses through the pump surface to a sufficient level to allow at least ten percent optical to optical efficiency from the gain medium.

40. The laser system of claim 4, wherein the laser mode is spaced from the pump surface of the gain medium by a distance that reduces diffraction losses through the pump surface to a sufficient level to allow at least twenty percent slope efficiency within the gain medium.

41. The laser system of claim 40, wherein the laser mode is disposed symmetrically around the optical axis.

42. The laser system of claim 1, wherein a $1/e^2$ point of the laser mode is spaced from the pump surface of the gain medium by a distance of at least approximately two hundred microns.

43. The laser system of claim 1, wherein a $1/e^2$ point of the laser mode is spaced from the pump surface of the gain medium by a distance of between approximately two hundred and three hundred microns.

44. The laser system of claim 1, wherein the gain medium is Nd:YVO$_4$.

45. The laser system of claim 44, wherein the gain medium incorporates approximately 1% neodymium.

46. The laser system of claim 44, wherein the gain medium incorporates about 0.6–1.0% neodymium.

47. The laser system of claim 44, wherein the gain medium incorporates about 0.5–1.5% neodymium.

48. The laser system of claim 4, wherein the gain medium has top and bottom surfaces defining the vertical dimension of the gain medium, and wherein the laser mode is spaced from the top and bottom surfaces by second and third distances that are each larger than a fourth distance separating the laser mode from the pump surface.

49. The laser system of claim 46, wherein the gain medium has an inverse of an absorption coefficient for radiation in the beam of light that is shorter than a width of the gain medium in a second transverse direction that is perpendicular to the first transverse direction and the optical axis.

50. The laser system of claim 47, wherein fourth distance is such that diffraction losses through the pump surface are sufficiently low to allow at least ten percent optical to optical efficiency for the solid-state laser output.

51. The laser system of claim 47, wherein fourth distance is such that diffraction losses through the pump surface are sufficiently low to allow at least twenty percent slope efficiency for the solid-state laser output.

52. The laser system of claim 50, wherein the laser mode is disposed symmetrically around the optical axis.

53. The laser system of claim 51, wherein at least 90% of the solid-state laser output power is in the $TEM_{00}$ mode.

54. The laser system of claim 49, wherein a $1/e^2$ point of the laser mode is spaced from the pump surface of the gain medium by the fourth distance of at least approximately two hundred microns.

55. The laser system of claim 54, wherein a $1/e^2$ point of the laser mode is spaced from the pump surface of the gain medium by the fourth distance of between approximately two hundred and three hundred microns.

56. A laser system comprising:
a laser cavity having an optical axis passing through the laser cavity;
a solid-state gain medium having a first transverse direction that is substantially perpendicular to the optical axis, the solid-state gain medium within the laser cavity and the optical axis passing through the solid-state gain medium; and
at least one semiconductor laser emitting a beam of light wider than a height of the beam at an output of the at least one semiconductor laser, the at least one semiconductor laser positioned to direct the beam of light through a pump surface of the gain medium to pump the gain medium, with the beam of light diverging in the first transverse direction, the beam of light from the at least one semiconductor laser pumping a laser mode within the gain medium to produce solid-state laser output,
the laser cavity positions the laser mode so that the optical axis is parallel to the pump surface, and
the at least one semiconductor laser provided adjacent the pump surface so that the beam of light matches the laser mode.

57. The laser system of claim 56, wherein a width of the beam of light is at least half of a length of the laser mode within the gain medium.

58. The laser system of claim 56, wherein the at least one semiconductor laser is spaced from the face of the solid-state gain medium by a first distance.

59. The laser system of claim 58, wherein no focusing optics are provided between the at least one semiconductor laser and the face of the solid-state gain medium.

60. The laser system of claim 58, wherein the first distance provides a maximum output from the laser system for a particular output power of the at least one semiconductor laser.

61. The laser system of claim 58, wherein the first distance is within 50 $\mu$m of a position that corresponds to the maximum output from the laser system for a particular output power of the at least one semiconductor laser.

62. The laser system of claim 61, wherein the temperature of the gain medium is maintained at a temperature lower than a temperature of the at least one semiconductor laser.

63. The laser system of claim 61, wherein the first distance is within 100 $\mu$m of a position that corresponds to the maximum output from the laser system for a particular output power of the at least one semiconductor laser.

64. The laser system of claim 58, wherein the first distance is within 150 $\mu$m of a position that corresponds to the maximum output from the laser system for a particular output power of the at least one semiconductor laser.

65. The laser system of claim 58, wherein the laser system includes a stereolithographic apparatus and wherein the stereolithographic apparatus receives as input a frequency multiplied laser beam.

66. The laser system of claim 65, wherein the laser system operates at a pulsed repetition frequency (PRF).

67. The laser system of claim 66, wherein the PRF is at least about 40 kHz.

68. The laser system of claim 67, wherein an ellipticity of the frequency multiplied laser beam is less than about 1.3.

69. The laser system of claim 66, wherein an ellipticity of the frequency multiplied laser beam is about 1.

70. The laser system of claim 56, wherein the laser cavity is defined in part by a high reflectivity mirror, an output coupler and a thermal lens formed within the gain medium.

71. The laser system of claim 70, wherein the thermal lens is the strongest focussing element within the laser cavity.

72. The laser system of claim 56, wherein the thermal lens stabilizes the laser cavity.

73. The laser system of claim 56, further comprising a frequency multiplying apparatus that receives the solid-state laser output and outputs a shorter wavelength output.

74. The laser system of claim 73, wherein the frequency multiplying apparatus is a frequency doubling crystal and the shorter wavelength output is a frequency doubled laser beam.

75. The laser system of claim 73, wherein the frequency multiplying apparatus includes two harmonic generating crystals and the shorter wavelength output is a frequency tripled laser beam.

76. A laser system, comprising:
a lasing medium for producing a laser beam of a desired wavelength;
at least one diode laser for directing a pumping beam along a pumping optical path for side pumping the lasing medium and producing a population inversion in the lasing medium; and
optical elements for forming a resonant cavity around the lasing medium defining a set of modes and for producing the laser beam,
wherein the optical elements are disposed to position the set of modes within the lasing medium and the at least one diode laser provides a pump wavelength different from a peak of absorption of the lasing medium,
the at least one diode laser provided adjacent a face of the lasing medium so that the pumping beam is matched to a lasing mode of the laser system.

77. The laser system of claim 76, wherein the lasing medium has a high-absorption coefficient.

78. The laser system of claim 77, wherein the output power in the laser beam is a maximum for a selected power level of the pumping beam.

79. The laser system of claim 78, wherein the set of modes consists of a $TEM_{00}$ mode.

80. The laser system of claim 78, wherein at least 90% of the output power of the laser is in a $TEM_{00}$ mode.

81. The laser system of claim 76, wherein the beam of light has an angular divergence in a direction along a first transverse direction that is substantially perpendicular to the optical axis.

82. The laser system of claim 81, wherein the at least one diode laser is spaced from the face of the lasing medium by a first distance to match the angular divergence of the beam of light to a height of the set of modes of the laser system.

83. The laser system of claim 82, wherein no focusing optics are provided between the at least one diode laser and the face of the lasing medium.

84. The laser system of claim 83, wherein the first distance is selected to provide a maximum output from the laser system for a particular output power of the at least one diode laser.

85. A laser system, comprising:
a lasing medium for producing a laser beam of a desired wavelength;
at least one diode laser for directing a pumping beam along a pumping optical path for side pumping the lasing medium and producing a population inversion in the lasing medium;
optical elements for forming a resonant cavity around the lasing medium defining a set of modes and for producing a the laser beam; and
wherein the optical elements are disposed to position the optical set of modes within the lasing medium, spaced from all sides of the lasing medium,
wherein the pumping optical path contains no focusing optics between the at least one diode laser and the lasing medium, and
wherein the at least one diode laser is spaced from the side face of the lasing medium by a first distance to match an angular divergence of the pumping beam to a height of the set modes of the laser system.

86. The laser system of claim 85, wherein the lasing medium has first and second end faces and wherein the laser beam passes through the first and second end faces.

87. The laser system of claim 86, wherein the set of modes is spaced from and parallel to a side face of the lasing medium.

88. The laser system of claim 87, wherein a $1/e^2$ point of the set of modes is spaced from the side face of the lasing medium by a distance of at least approximately two hundred microns.

89. The laser system of claim 87, wherein a $1/e^2$ point of the set of modes is spaced from the side face of the gain medium by a distance of between approximately two hundred and three hundred microns.

90. The laser system of claim 87, wherein the set of modes is spaced from the side face of the lasing medium by a distance that reduces diffraction losses through the side face to a sufficient level to allow at least ten percent optical to optical efficiency for the laser system.

91. The laser system of claim 90, wherein the set of modes consists only of a substantially $TEM_{00}$ mode of the resonant cavity.

92. The laser system of claim 91, wherein the lasing medium is $Nd:YVO_4$.

93. The laser system of claim 92, wherein the lasing medium incorporates approximately 1% neodymium.

94. The laser system of claim 85, wherein the first distance is selected to provide a maximum output from the laser system for a particular output intensity of the at least one diode laser.

95. A laser system, comprising:
a lasing medium for producing a laser beam of a desired wavelength;
at least one diode laser for directing a pumping beam along a pumping optical path for side pumping the lasing medium and producing a population inversion in the lasing medium; and
optical elements for forming a resonant cavity around the lasing medium, the optical elements defining a set of modes and for producing the laser beam,
wherein the optical elements are disposed to position the set of modes within the lasing medium,
the at least one diode laser provided adjacent a face of the lasing medium so that the pumping beam is matched to a lasing mode of the laser system.

96. A laser system, comprising:

a lasing medium for producing a laser beam of a desired wavelength;

at least one diode laser for directing a pumping beam along a pumping optical path for pumping the lasing medium at a pumping surface and producing a population inversion in the lasing medium; and optical elements for forming a resonant cavity around the lasing medium, the optical elements defining a set of modes and for producing the laser beam, wherein the optical elements are disposed to space the set of modes from the pumping surface of the lasing medium, the at least one diode laser provided adjacent to a face of the lasing medium so that the pumping beam is matched to a lasing mode of the laser system.

97. The system of claim 1 wherein the laser mode is positioned at a depth along a second transverse direction that is substantially perpendicular to the optical axis and to the first transverse direction.

98. A method for manufacturing a laser system, comprising the steps of:

providing a lasing medium for producing a laser beam of a desired wavelength;

providing at least one diode laser for directing a pumping beam along a pumping optical path for side pumping the lasing medium and producing a population inversion in the lasing medium; and providing optical elements for forming a resonant cavity around the lasing medium, the optical elements defining a set of modes and for producing the laser beam;

locating the optical elements to position the set of modes within the lasing medium;

locating the at least one diode laser at a distance spaced from a face of the lasing medium to supply the pumping beam to the lasing medium;

relatively moving the lasing medium and the diode laser a plurality of times to a plurality of relative positions and noting an output power of the laser beam for each of the plurality of relative positions; and fixing the relative position of the diode laser and the lasing medium at a selected a position so that the output power is at least 50% of a maximum output power as determined in the moving step.

99. A method for preparing a laser system for operation, comprising:

a. providing a laser system, comprising:
  i. a lasing medium for producing a laser beam of a desired wavelength;
  ii. at least one diode laser for directing a pumping beam along a pumping optical path for side pumping the lasing medium and producing a population inversion in the lasing medium; and
  iii. providing optical elements for forming a resonant cavity around the lasing medium, the optical elements defining a set of modes and for producing the laser beam,
  wherein the optical elements are located to position the set of modes within the lasing medium;
  wherein the at least one diode laser is spaced at a distance from a face of the lasing medium to supply the pumping beam to the lasing medium;

b. relatively moving the lasing medium and the diode laser a plurality of times to a plurality of relative positions and noting the output power of the laser beam for each of the plurality of relative positions; and c. fixing the relative position of the diode laser and the lasing medium at a selected a position so that the output power is at least 50% of a maximum output power as determined in the moving step.

100. A method for preparing a laser system for operation, comprising:

a. providing a laser system, comprising:
  i. a lasing medium for producing a laser beam of a desired wavelength;
  ii. at least one diode laser for directing a pumping beam along a pumping optical path for side pumping the lasing medium and producing a population inversion in the lasing medium; and
  iii. providing optical elements for forming a resonant cavity around the lasing medium, the optical elements defining a set of modes and for producing the laser beam,
  wherein the optical elements are located to position the set of modes within the lasing medium;
  wherein the at least one diode laser is spaced at a distance from a face of the lasing medium to supply the pumping beam to the lasing medium;

b. providing a frequency conversion crystal that converts said laser beam of desired wavelength into a laser beam of second desired wavelength;

b. relatively moving the lasing medium and the diode laser a plurality of times to a plurality of relative positions and noting the output power of the laser beam of second desired wavelength for each of the plurality of relative positions; and c. fixing the relative position of the diode laser and the lasing medium at a selected a position so that the output power is at least 50% of a maximum output power of the laser beam of second desired wavelength as determined in the moving step.

* * * * *